United States Patent [19]

Toyao et al.

[11] Patent Number: 5,436,216
[45] Date of Patent: Jul. 25, 1995

[54] SELF-HEAT GENERATION TYPE HONEYCOMB FILTER AND ITS APPARATUS

[75] Inventors: Tetsuya Toyao, Toyoake; Takeshi Matsui, Toyohashi; Tetsuya Nakamura, Chiryu; Atsushi Okajima, Kariya; Hiromasa Aoki, Nagoya; Senta Tojo, Kariya; Naoki Nagata, Nagoya; Shigeru Maehara, Kariya; Kanehito Nakamura, Anjo, all of Japan

[73] Assignee: Nippondenso Co., Ltd., Kariya, Japan

[21] Appl. No.: 121,588

[22] Filed: Sep. 16, 1993

[30] Foreign Application Priority Data

Sep. 18, 1992 [JP] Japan .................. 4-249378
Sep. 14, 1993 [JP] Japan .................. 5-229060

[51] Int. Cl.$^6$ ............................ B01J 35/04
[52] U.S. Cl. .................... 502/439; 502/527; 423/213.2; 55/523; 55/DIG. 30; 422/173; 422/174; 422/177; 422/180
[58] Field of Search ............ 502/439, 527; 423/213.2; 55/523, DIG. 30; 422/174, 173, 177, 180

[56] References Cited

U.S. PATENT DOCUMENTS

| | | |
|---|---|---|
| 3,770,389 | 10/1973 | Kitzner et al. |
| 4,753,918 | 6/1988 | Cyron . |
| 4,934,142 | 6/1990 | Hayashi et al. .......... 55/DIG. 30 |
| 5,084,361 | 1/1992 | Toyoda et al. ............. 502/439 |
| 5,200,154 | 4/1993 | Harada et al. ............. 55/523 |
| 5,202,303 | 4/1993 | Retallick et al. ........... 502/527 |
| 5,278,125 | 1/1994 | Iida et al. ................... 502/439 |

FOREIGN PATENT DOCUMENTS

| | | |
|---|---|---|
| 62-53744 | 3/1987 | Japan . |
| 2223622 | 9/1990 | Japan . |
| 2-273549 | 11/1990 | Japan . |
| 3-94835 | 4/1991 | Japan . |

*Primary Examiner*—Anthony McFarlane
*Attorney, Agent, or Firm*—Cushman, Darby & Cushman

[57] ABSTRACT

A self-heat generating type honeycomb filter is mounted in an exhaust pipe line of an engine, and a plane plate and a corrugated plate are layered, then wound, and the first slit portion and second slit portion having openings, respectively, are formed between an up-stream and down stream side end portions of the plane and corrugated plates. An electric current is applied between the up-stream and down stream side end portions, to heat the first and second slit portions. Accordingly, a self-heat generation type catalytic converter capable of realizing both high resistance and low thermal capacity, and further ensuring a reduction in thermal conduction, and durability, and raising the temperature up to the sufficient level with less power consumption, can be provided.

11 Claims, 33 Drawing Sheets

SELF-HEAT GENERATION TYPE HONEYCOMB FILTER AND ITS APPARATUS

BACKGROUND OF THE INVENTION

1. Field of the Invention

The present invention relates to a self-heat generation type honeycomb filter and its apparatus, and more specifically, to a honeycomb filter employed for the catalytic converter of an automobile in order to accelerate the activation of substance bringing about a catalytic action.

2. Description of the Prior Art

Conventionally, conversion from noxious elements such as CO, HC, and NOx, included in exhaust gas, to innoxious gas or water, has been performed, for example, through a catalytic converter provided in an exhaust pipe line from an engine for an automobile. However, there has been a problem which can not be solved simply by the use of the converter, that is, a catalytic substance is not substantially activated in a state that the temperature of exhaust gas from an engine just after it start up, is too low to purify the exhaust gas substantially.

Consequently, it has been proposed in the U.S. Pat. No. 3,770,389 and Japanese Patent Unexamined Publication No. 2-223622 that a catalytic converter comprising a self-heat generation type honeycomb carrier including a separate self-heat generation type honeycomb filter into which catalytic substance is supported, is provided to a honeycomb carrier into which the catalytic substance of a catalytic converter is supported, so that when an electric current is applied to the self-heat generation honeycomb carrier and it heats up, then the activation of the catalytic substance is accelerated.

This self-heat generation type honeycomb carrier is formed of a corrugated metal plate shaped in belt having a wave-like irregular surface successively bent and a plane metal plate shaped in belt having a flat surface, the corrugated and plane metal plates are put on another, and rolled together or laminated in layer.

A self-heat generation honeycomb carrier has been also proposed in that an electric current is applied from the center of a catalytic converter toward outer side face through electrodes provided at the center part and outer circumferential face to heat up the converter.

However, when such self-heat generation type honeycomb carrier is employed, a predetermined value of resistance is required for the corrugated and plane plates in order to electrically heat them up and raise the temperature. Consequently, when the carrier into which an electric current is applied from the central electrode toward the outer side face, is employed, a belt-like material for the corrugated and plane plates requires a substantial length for each to ensure the value of resistance.

On the other hand, such conventional honeycomb carrier having a sufficient metal foil portion in length, as mentioned above, increases itself in thermal capacity. Thus, another problem to be solved is created; a preferable high performance in purification can not be obtained unless sufficiently great electric current in magnitude is applied to the carrier, since an increase in temperature is relatively slow when an electric current is applied.

It is preferred that both catalytic parts of the corrugated and plane plates are mechanically joined, in order to provide a sufficient strength in structure against vibration from an engine. However, it is extremely difficult to join them, while the electric insulation between them is completely ensured. Especially, when an electric current is applied from the central electrode toward the outer side face, both end faces welded to join each other can not have a sufficient resistance. Further, the end faces of the honeycomb carrier can not be simply welded, so that it is very difficult to keep the electric insulation, while the sufficient strength is ensured.

It takes a long time to heat up the catalytic substance up to the activation temperature with the conventional catalytic converter, since, when the converter is electrically heated up, the heat raised by thermal conduction in the metal foil forming the corrugated and plane plates is diffused into the whole carrier.

As described above, it is extremely difficult to realize both requirements for the converter simultaneously; a preferred value in resistance and a decrease in thermal capacity.

SUMMARY OF THE INVENTION

Accordingly, it is an object of the present invention to provide a self-heat generation type honeycomb filter which has both high resistance and low thermal capacity, and also has low thermal conduction and durability, so as to raise the temperature up to the sufficient value with less power consumption.

In order to achieve the object, preferably the present invention provides a self-heat generation type honeycomb filer located in the exhaust pipe line system of an engine and formed of a plane plate and a corrugated plate, the filter comprising slit parts having openings at at least one part of said plane plate or corrugated plate.

According to the present invention, the provision of the slit parts facilitates to obtain a plane plate or a corrugated plate having a relatively high electric resistance compared with the conventional one.

Consequently, it is possible to raise the temperature with relatively low thermal capacity and less electric power, and short time, since there is no need to use long materials for the plane and corrugated plates as used to be.

The slit parts provided at the plane or corrugated plate allow a reduction in heat conduction extremely in the axial direction. The raised heat is regenerated in the catalytic converter to hasten the increase in temperature. Accordingly, the applied power can be save by the regeneration effect.

According to the present invention, it is possible to provide a self,heat generation type honeycomb filter which is very durable and capable of a high performance in purification with less power consumption.

DETAILED DESCRIPTION OF THE PREFERRED EMBODIMENTS (The first embodiment)

The first embodiment according to the present invention will be now hereinafter described in detail.

Figure 1:
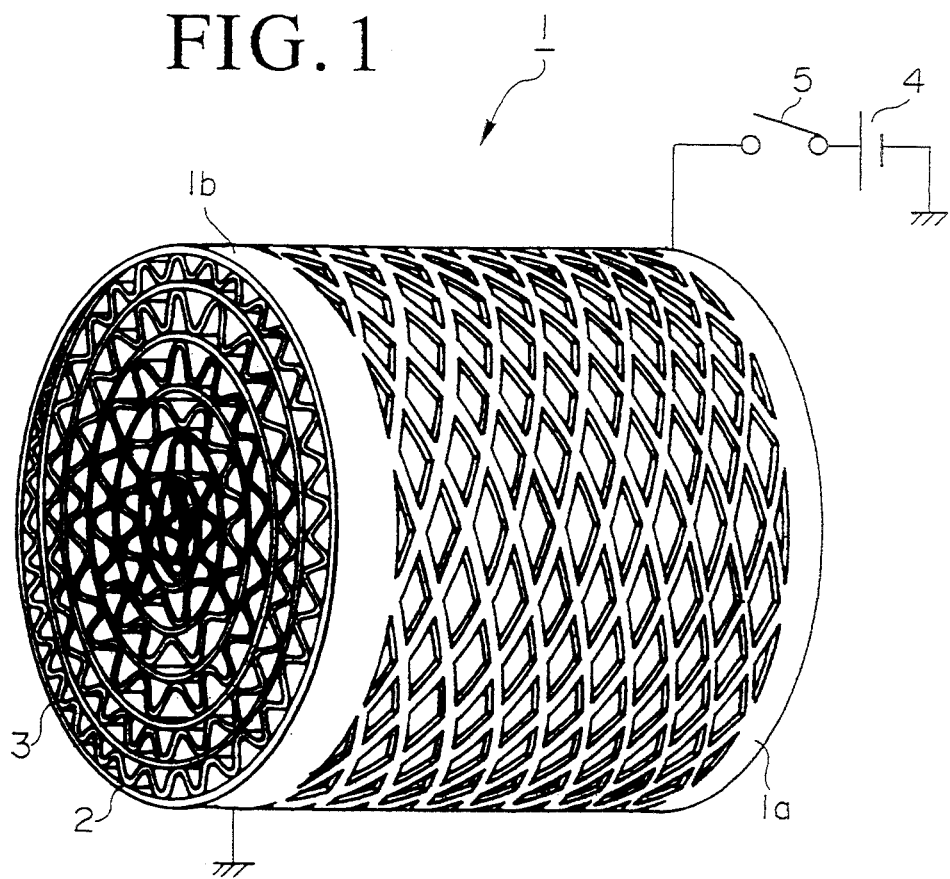
FIG. 1 shows a type schematic view of a catalytic carrier used for a self-heat generation type honeycomb filter according to the first embodiment of the present invention.

FIG. 1 is a schematic view of a self-heat generation type honeycomb carrier having a self-heat generation type honeycomb filter according to the present invention and a catalytic substance supported thereon.

A self-heat generation type honeycomb carrier 1 according to the embodiment, has a configuration in that a plane plate 2 and corrugated plate 3 have slits formed at locations other than a down stream side end portion 1a into which an electric current flows, and an up-stream side end portion 1b of which the current flows out, and both plates are layered and rolled in spiral shape.

The carrier 1 has also a power supply 4 and a switch 5 provided at the side end portion 1a and the portion 1b is grounded, so that an electric current flows between the both portions 1a and 1b.

Figure 2:
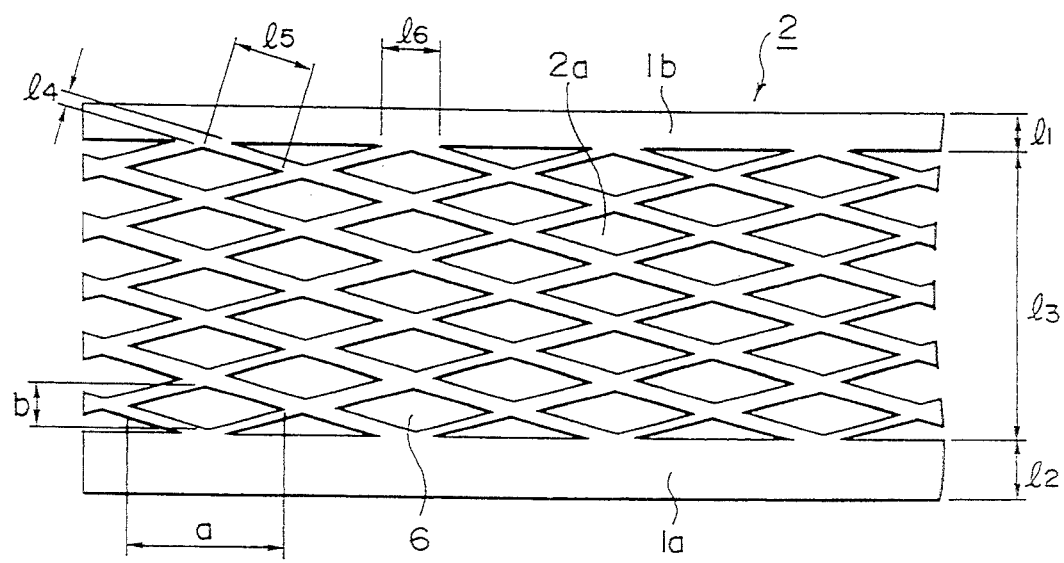
FIG. 2 is an exploded view showing a plane plate according to the same first embodiment.

FIG. 2 is a front view showing the shape of the first slit portion 2a in detail, formed at a plane plate 2 employed in the first embodiment.

The first slit portion 2a according to the first embodiment is provided between an up-stream side end portion 1b with a width $l_1$ and the down-stream side end portion 1a with a width $l_2$. A plurality of openings 6 are formed therein to be arranged in that each opening shaped in diamond has a long diagonal line a and a short one b, and arranged in that positions of the openings 6 are shifted each other by a half the length a; a/2.

The plane plate 2 is composed of Fe-Cr-Al material containing Cr; 18–24 wt %, Al; 4.5–5.5 wt %, rare-earth metal (REM); 0.01–0.2 wt %, and Fe; all the rest, and shaped in belt having a thickness; t=0.03–0.05 mm.

The corrugated plate 3 has also the second slit portion 3a formed in the same shape as the first slit portion 2a formed at the plane plate 2, and further irregularities are formed successively thereat.

Figure 3:
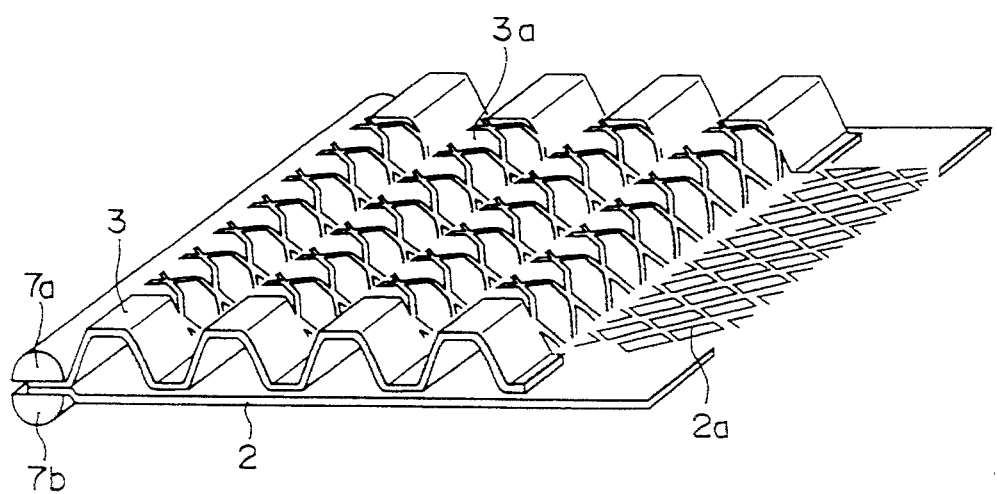
FIG. 3 is a schematic view showing a connected condition of plane and corrugated plates of the catalytic carrier according to the same first embodiment.

In FIG. 3, a method of producing a self-heat generation type converter according to the first embodiment will be described.

A self-heat generation type converter 1 according to the embodiment is produced in the following manner.

As shown in FIG. 3, the plane plate 2 and corrugated plate 3 are layered by means of semi-cylindrical winding tools 7a and 7b, so that the second slit portions 3a of the plate 3 and the first slit portions 2a of the plate 2 face each other. The winding tools 7a and 7b are rotated on its center to wind up the plates up to a predetermined dimension, and removed when the wound up plates reach to the predetermined dimension.

After winding up till they reach to the predetermined dimension, portions in contact with the plate 2 and 3 at both end faces, are electrically shorted by means of electric discharge welding, laser welding, or soldering to join the plate 2 with the plate 3.

This structure is heated up at temperatures of 800° C.–1200° C. for 1–10 hours to let Aluminum oxide deposit onto the metal surface, so that the full range of the contact portions between plates 2 and 3 are joined by the Aluminum oxide. The structure is processed in Wash-Coating, that is, it is impregnated into a slurry containing $\gamma$-$Al_2O_3$, and then baked.

After that, the structure is impregnated into an aqueous solution in which a catalytic metal, for example, Pt or Ph is dissolved, and sintered again.

As a result, a self-heat generation type honeycomb carrier 1 having $\gamma$-$Al_2O_3$ and catalytic substance adhered thereonto, is provided.

A casing for the above honeycomb carrier 1 will be described. The carrier 1 according to the first embodiment is mounted in the exhaust pipe line of an automobile by the casing.

In the first embodiment, the honeycomb carrier 1 has dimensions; 67 mm in diameter and 78 mm in length. The first slit 2a and second slit 3a of the plane plate 2 and corrugated plate 3 are the same in shape and each dimension of the portions referred in FIG. 3; $l_1=10$ mm, $l_2=36.5$ mm, $l_3=31.5$ mm, $l_4=0.15$ mm, $l_5=6$ mm, and $l_6=2$ mm.

Thus, a plane plate 2 is made of Fe-Cr-Al-REM and has a thickness of 0.05 mm and slits shaped therein in the dimension as mentioned above, and a corrugated plate 3 is made of the plane plate 2 which is processed into a corrugated plate material having a wave height of 1.875 mm, a wave pitch of 3.75 mm. Then both two plates 2 and 3 are layered together and wound in round shape.

Figure 4:
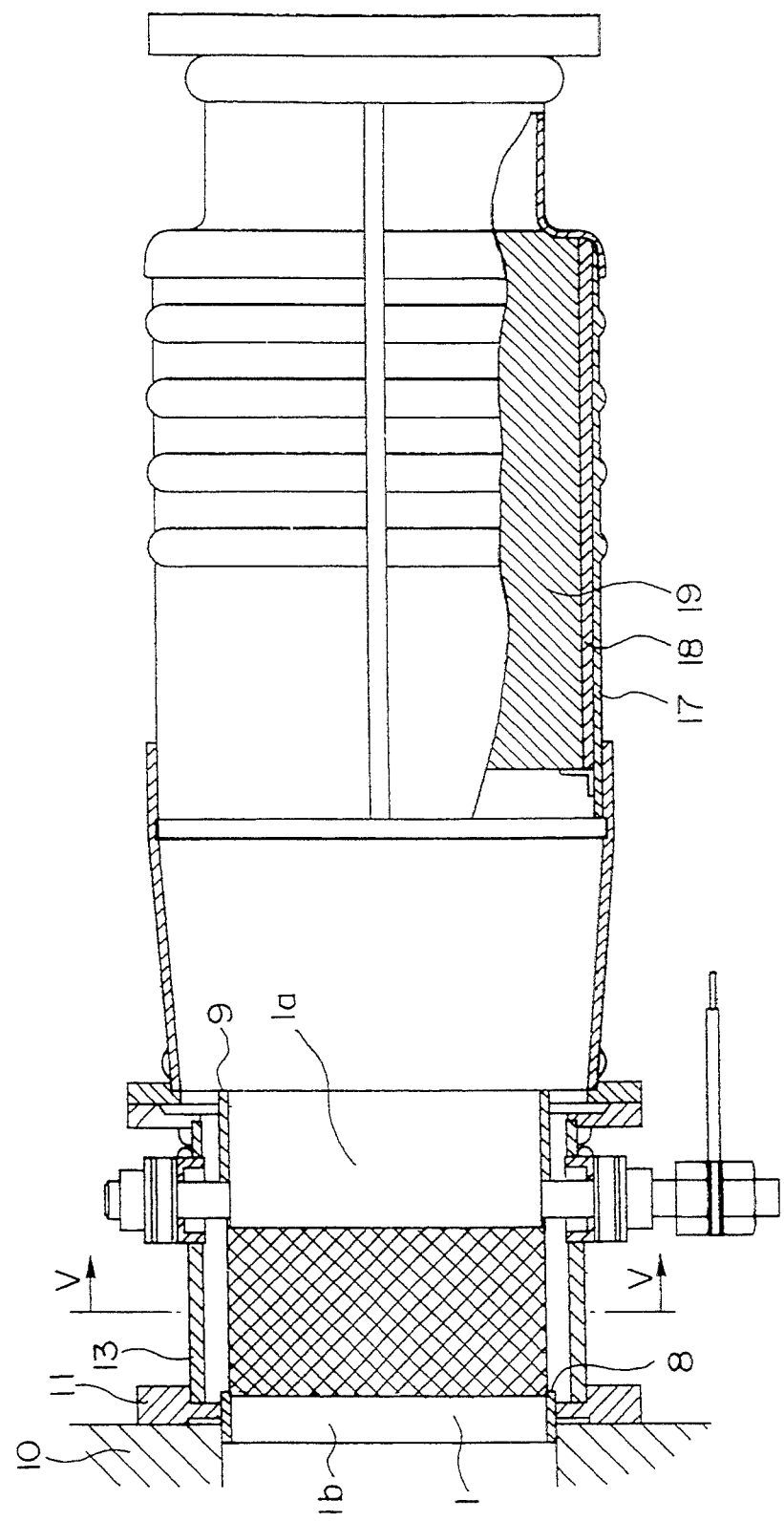
FIG. 4 is a schematic view of a self-heat generation type catalytic converter located in a exhaust pipe line in association with the same first embodiment.

FIG. 4 is a structural view showing this self-heat generation type honeycomb carrier 1 mounted in an exhaust pipe line.

Figure 5:
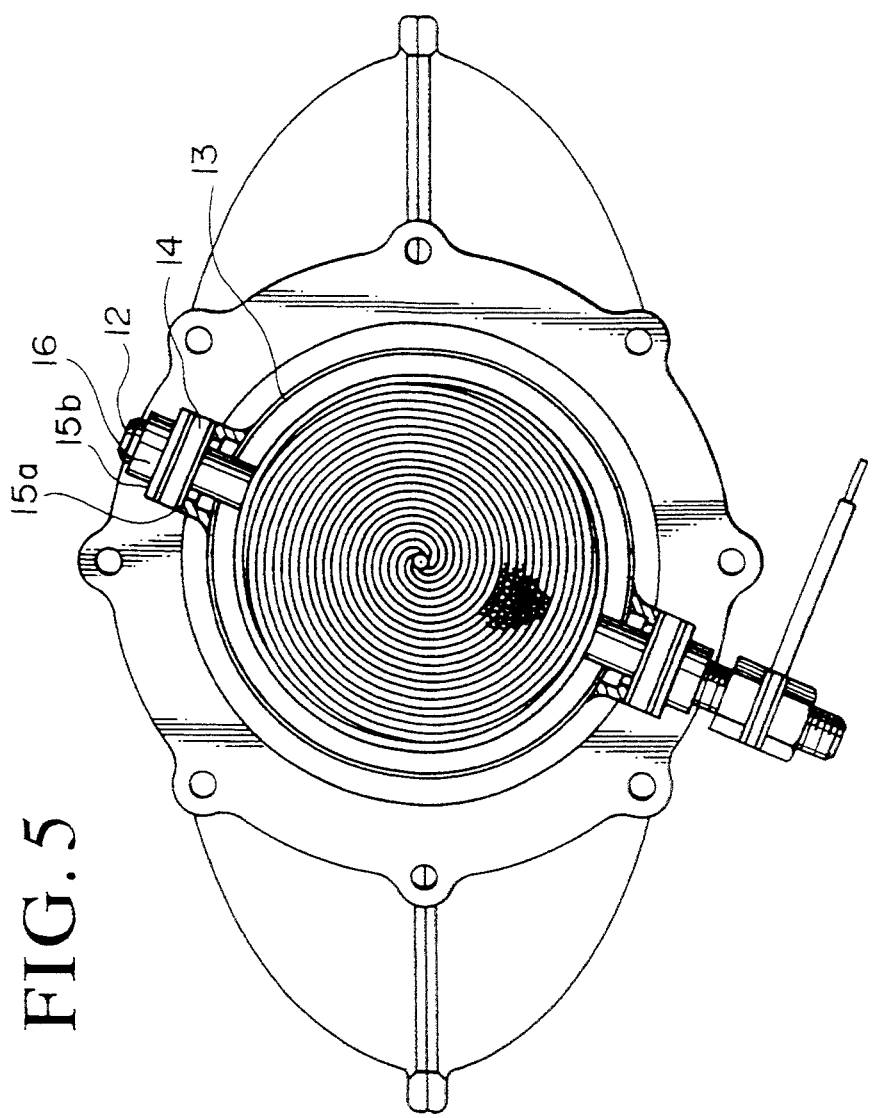
FIG. 5 is a cross sectional view taken along the line V-V' of FIG. 4.

As shown in FIG. 4, an up-stream side ring 8 and a down-stream side ring 9 each made of stainless steel are soldered at an up-stream side end portion 1b and a down-stream side end portion 1a, respectively. A flange 11 is welded with the up-stream side ring 8 so as to mount an exhaust manifold 10 thereto. A supporting bar 12 made of stainless-steel is mounted at the ring 8 as shown in FIG. 5 showing a cross sectional view taken along the, line V—V in FIG. 4.

The bar 12 is air-tightly fixed with a ceramic gasket 14 and the first and second copper gaskets 15a and 15b, and a nut 16 to be screwed onto the thread portion of the bar 12, so that the bar 12 is electrically insulated from an outer circumferential case 13. A ceramic main monolith catalyst 19 having a volume of 1,300 cc, supported in a case 17 having a oval shape in cross section by a wire net 18, is supported at the down-stream side just below the carrier 1.

Figure 6:
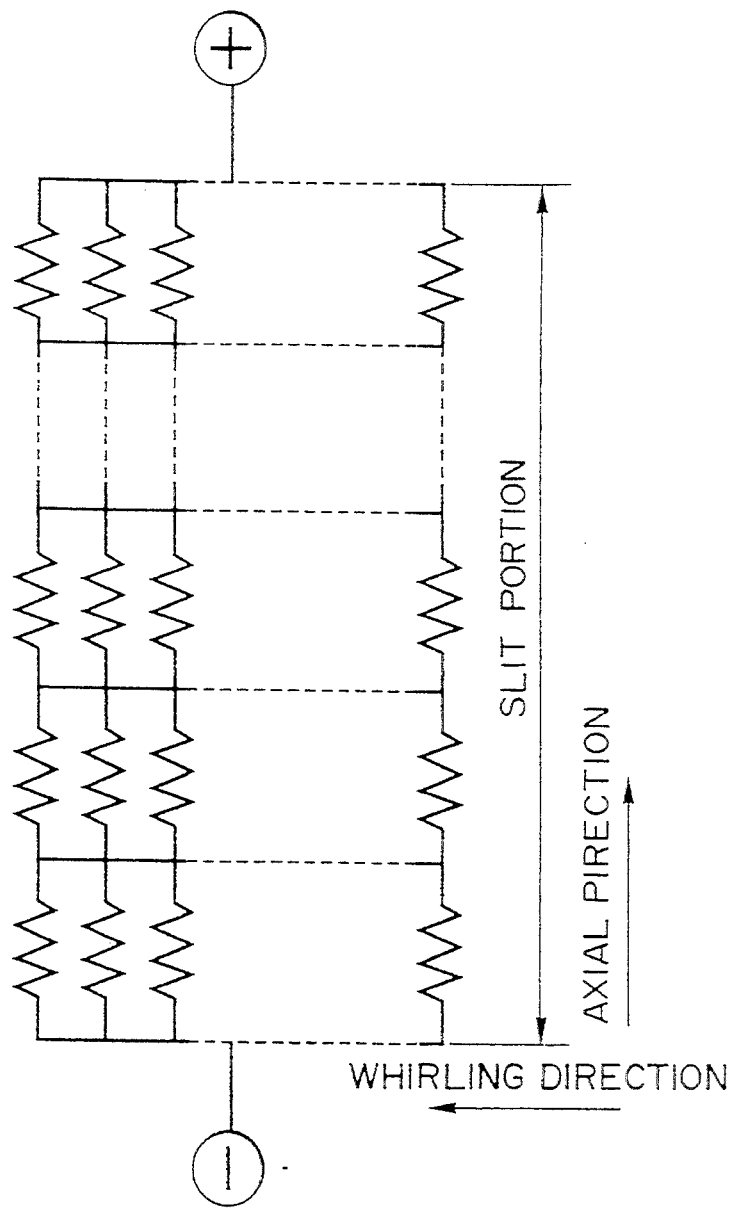
FIG. 6 is an equivalent circuit view showing an equivalent circuit as a register of the carrier associated with the first embodiment of the present invention.

According to the first embodiment, when a slit shape shown in FIG. 2, is employed, the resistance of each foil portion $l_4 \times l_5$ left after the first and second slits 2a and 3a are taken away, has about 1Ω, therefore, the structure, as a whole, has an equivalent circuit shown in FIG. 6.

Namely, each register in FIG. 6 is about 1Ω, so that it is possible to provide a group of relatively high registers having resistances about 0.13Ω as a whole.

When operating power having an electric current of about 75–100 A at a voltage 10–20 V is supplied just after engine start-up to the self-heat generation type honeycomb carrier 1 having the structure as mentioned above, it takes about 20 seconds (the engine in idling state) to heat up the carrier 1 to the temperatures of 400° C.–500° C., and catalyst is activated to purify exhaust gas.

As described above, the carrier 1 according to the embodiment has a plane plate 2 and a corrugated plate 3 on which the first and second slits 2a and 3a, are provided, respectively, so that it is easy to provide a register having high resistance when an electric current is applied between the up-stream and down-stream side end portions 1a, 1b. Therefore, there is no need to use a long metal foil to ensure a sufficient resistance any longer as conventionally used to do, thus a structure having relatively low thermal capacity can be realized. Accordingly, the catalyst is heated up and activated for a short time with less power.

The first and second slits 2a and 3a formed in the plane and corrugate plates 2 and 3, respectively, are shifted in the axial direction of the carrier 1, such that the position of the slit interval is alternately shifted by the half of the length in the axial direction. Therefore, its heat conduction is extremely reduced in comparison with one of a conventional self-heat generation type honeycomb carrier having no slit.

For example, with a slit size used in FIG. 2, the ratio is about $8 \times 10^{-4}$ times, so heat while an electric current is applied and the temperature is raised up, is easy to be regenerated in the carrier 1. Accordingly, there are some portions which reach the activation temperature of catalyst faster after heating starts, then those portions produce the heat of catalytic reaction to activate the another portions. Thus, an applied power is saved by this regeneration effect.

The use of the first and second slits 2a and 3a formed at the plane and corrugate metal foil plates 2 and 3, respectively, can reduce extremely its thermal conductivity, so that heat while an electric current is applied and the temperature is raised up, is easy to be regenerated in the carrier 1. Accordingly, there are some parts which reach the activation temperature of catalyst faster in comparison with one of a conventional carrier after heating starts, then the entire body is quickly raised in temperature and activated by the heat of catalytic reaction produced from those parts. Namely, an applied power is reduced by this regeneration effect.

The catalytic portions at both end faces of the corrugated and plane plates are completely welded, so that an extremely rigid and durable self-heat generation type honeycomb carrier which can endure against thermal load and engine vibration, is realized.

Figure 7:
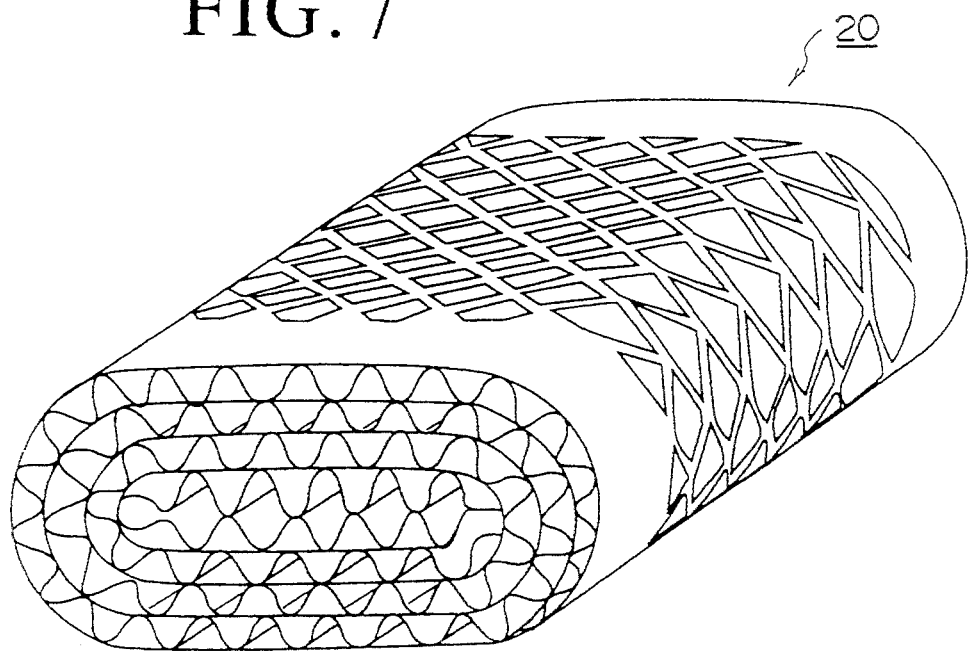
FIG. 7 is a schematic view showing another embodiment of a catalytic carrier of the self-heat generation type honeycomb filter according to the present invention.

In the embodiment mentioned above, the cross sectional view is a round shape, though, it is not limited to this shape, for example, as shown in FIG. 7, a converter 20 may be formed by winding to be an oval shape (a track) in cross-sectional view.

Figure 8:
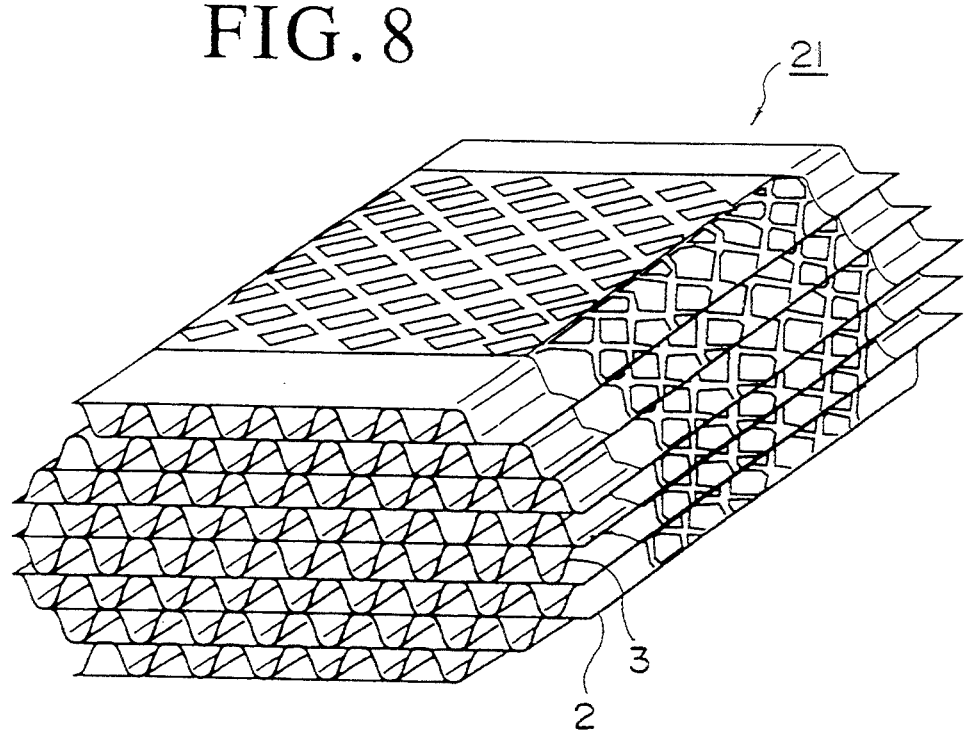
FIG. 8 is a schematic view showing another embodiment of a joining condition of plane and corrugated plates of the catalytic carrier according to the present invention.

As shown in FIG. 8, a converter having a cross sectional shape to be the same as the shape in FIG. 7 may be formed by laminating the corrugated and plane plate materials 1 and 2, alternately.

The slit shape provided for the plane and corrugated plates 2 and 3, made from Fe-Cr-REM, is a diamond shape in the first embodiment, though, it is also not limited to this, it may be a lattice shape either in FIGS. 9, 10, 11 or 12.

Figure 9:
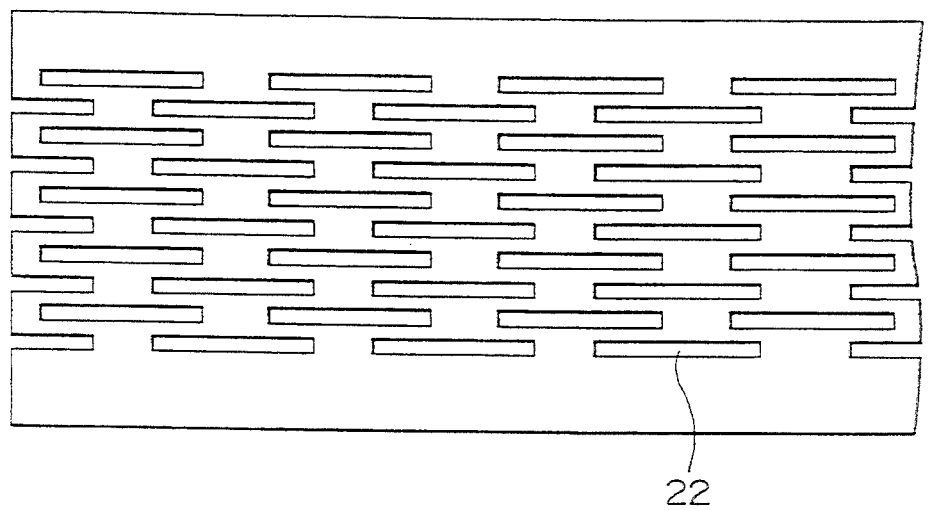
FIG. 9 is an illustration showing another embodiment of a slit shape on the plane or corrugated plate associated with the first embodiment of the present invention.

Namely, a slit or opening 22 shaped as shown in FIG. 9, is easy to produce, since first of all, a material is processed to have breaks in the longitudinal direction by a shearing machine or the like, and then beaten out.

Figure 10:
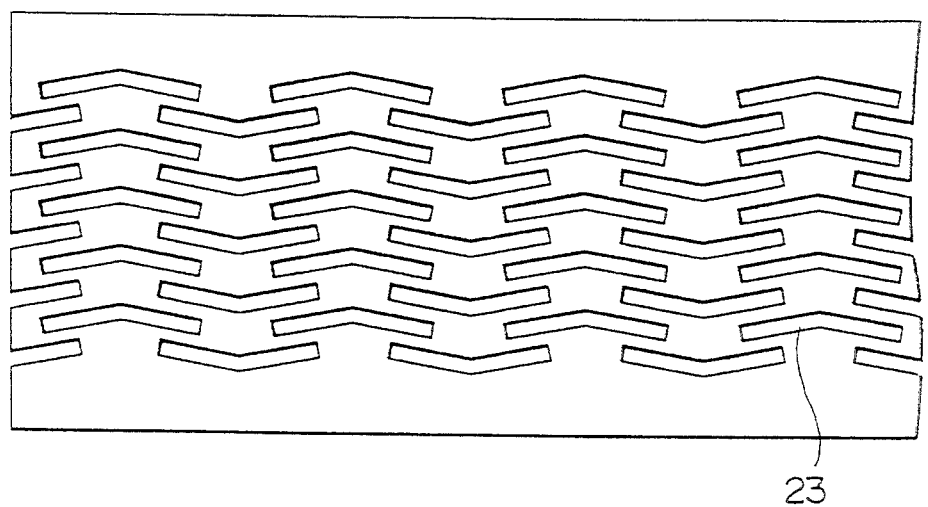
FIG. 10 is an illustration showing still another embodiment of a slit shape on the plane or corrugated plate associated with the same first embodiment.

Slits or openings 22 and 23 shown in FIG. 9 and 10, are also easy to produce by processing the material with etching and press machines or the like.

Figure 11:
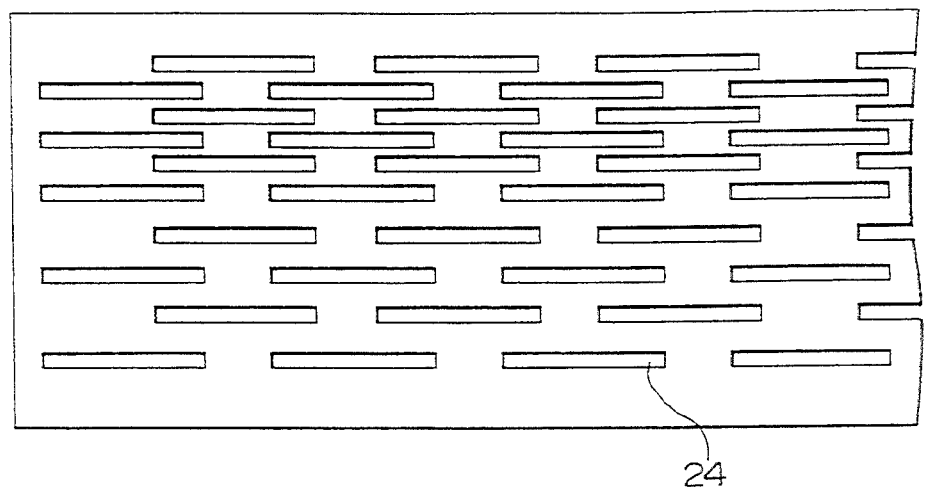
FIG. 11 is an illustration showing still another embodiment of a slit shape on the plane or corrugated plate associated with the same first embodiment.

Plane and corrugated plates having a slit pattern 24 as shown in FIG. 11 may have a slit shape in another embodiment.

There is no need for the slit shape to be a single type, and each slit may be located variously depending on a certain area as shown in FIG. 11, so that a register having high resistance is arranged at the front portion which is heated up easily by exhaust heat so as to efficiently utilize the less power consumption effect.

Figure 12:
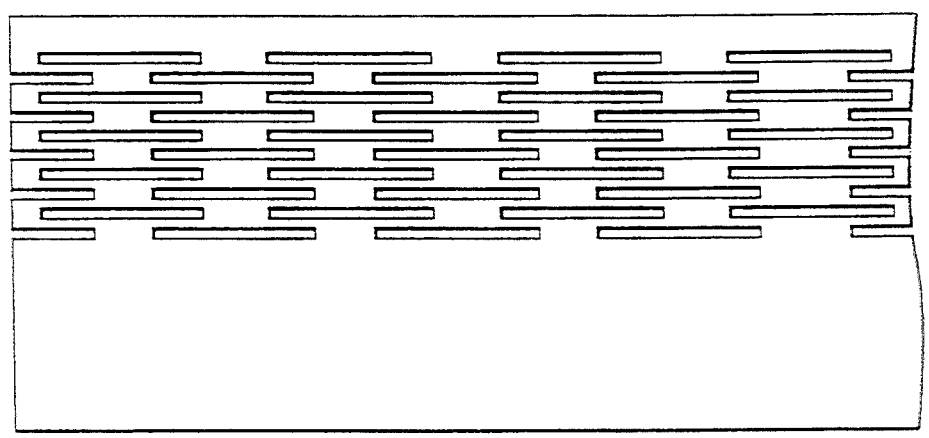
FIG. 12 is an illustration showing still another embodiment of a slit shape on the plane or corrugated plate associated with the same first embodiment.

As shown in FIG. 12, plane and corrugate plates having no slits formed on their down-stream and up-stream sides in an exhaust pipe line may be also possible.

It was described as an example that the carrier according to the invention as shown in FIGS. 4 and 5, was fixed extremely adjacent to the exhaust manifold so as to quickly heat it up by the heat of exhaust gas. However, it should be noted that such location will be under the extremely severe environment caused by the high temperatures of exhaust gas and the vibration of an engine while an automobile is in operation.

This carrier 1 is extremely rigid and durable enough without problem for thermal load and engine vibration, since the corrugated and plane plates at both end faces are mechanically joined in welding, and all range of plates are joined with Aluminium oxide by means of oxidizing heat treatment.

Slits are provided at the plane and corrugated plates forming a self-heat generation type honeycomb carrier which is a self-heat generation type honeycomb filter with catalyst supported thereon in the first embodiment. However, a self-heat generation type honeycomb filter which is capable of generating sufficient heat as in the embodiment, is provided, even when slits are provided at plane and corrugated plates forming a self-heat generation type honeycomb filter without catalyst supported thereon, and the filter is small.

(The second embodiment)

Figure 13:
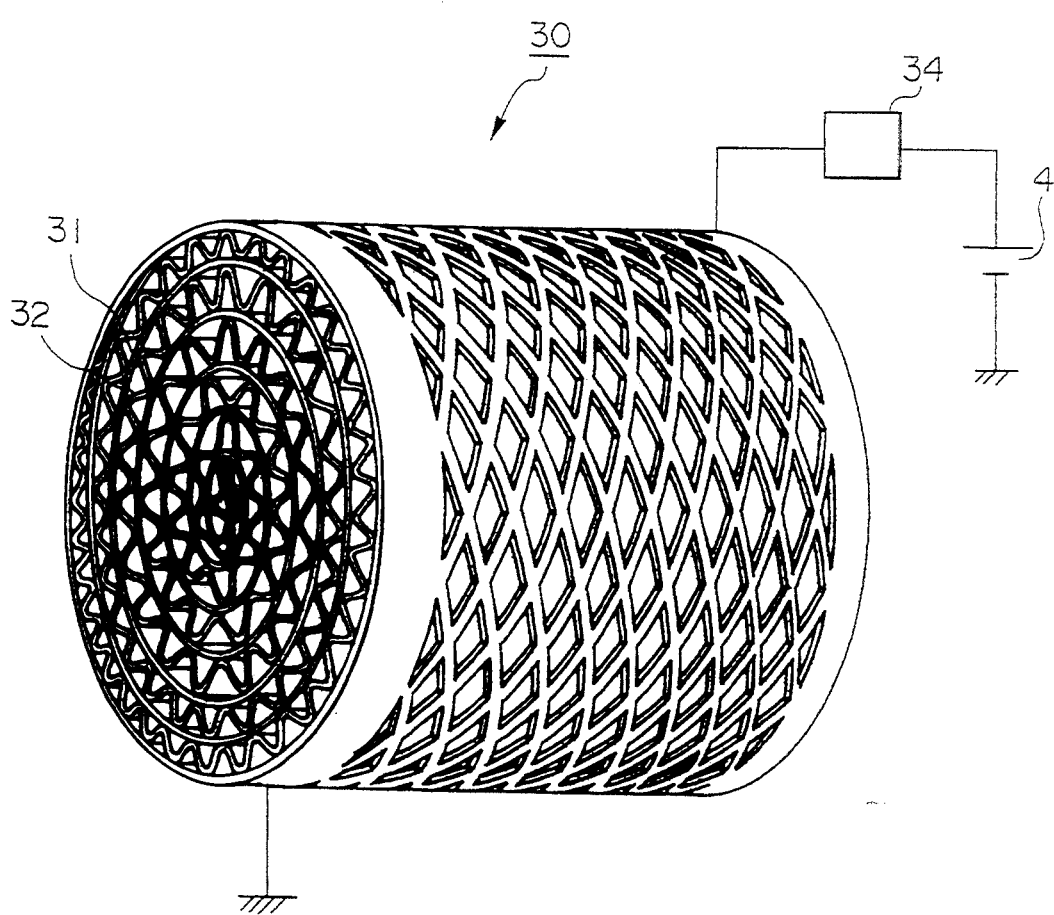
FIG. 13 shows a schematic view of a catalytic carrier used for a self-heat generation type honeycomb filter associated with the second embodiment of the present invention.

FIG. 13 shows a structure according to the second embodiment.

In this second embodiment, there is provided a slit shape which is suitable for raising temperatures quickly.

The second embodiment will be described hereinafter in detail.

A honeycomb carrier 30 is a honeycomb body formed of a plane plate 31 and a corrugated plate 32 having slits formed successively thereat, respectively.

FIG. 13 is an exploded view of the plane plate 31, and corrugated plate 32 made of the plane plate 31 which is processed by bending to form wave-like irregularities successively in the longitudinal direction, forming the honeycomb carrier 30.

Figure 14:
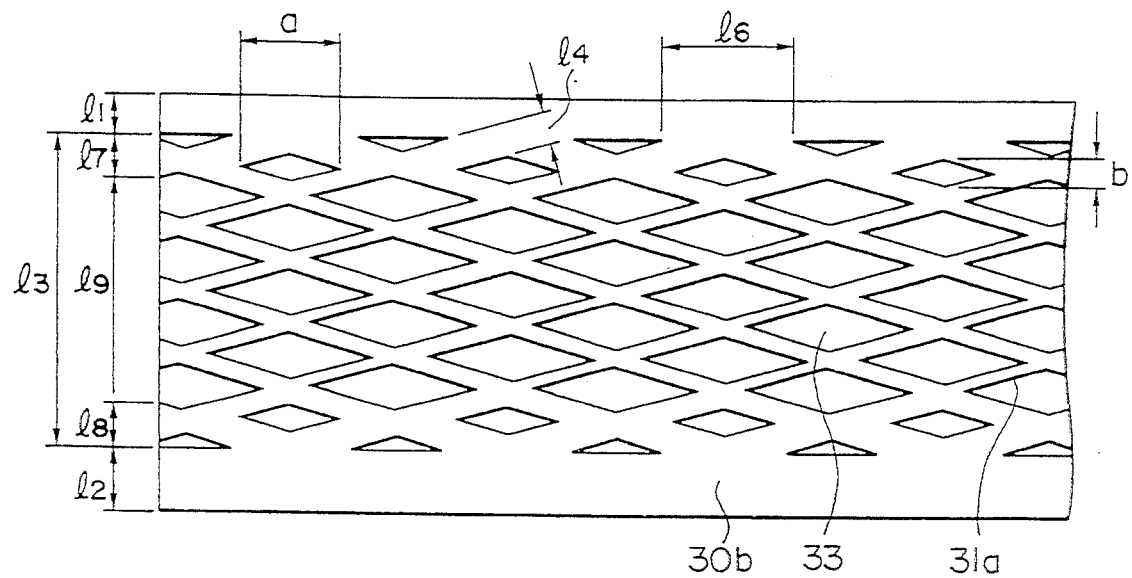
FIG. 14 is an exploded view of a plane plate of the catalytic carrier associated with the same second embodiment.

As shown in FIG. 14, the plane and corrugated plates 31, 32 according to the embodiment, have end portions 30a and 30b without slit thereat, having widths $1_1$ and $1_2$, respectively, left at both edges of a thin plane material made of stainless steel (ex. Fe-20Cr-5Al). The plates 31, 32 have also arbitrary shaped small holes or slits 31a formed successively at the middle portion 13.

At least either one of the horizontal width b or vertical width a of an opening 33 forming the slit 31a is shrunk at the boundary portions 17, 18 between the end portions 30a, 30b and the central portion 19. Therefore, either one of the slit width $1_4$ or interval between openings $1_6$ at the boundary portions 17, 18, is expanded.

On the other hand, it is characterized in that the slit width $1_4$ and interval between openings $1_6$ at the rest except opening 33 at the central portion 19, are shrunk in this embodiment.

The slits in FIG. 14 are easily produced, since holes shaped in parallelogram are just simply formed successively.

A method of producing a honeycomb carrier 30 according to the second embodiment will be hereinafter described.

A honeycomb carrier 30 in FIG. 13 is formed in such a manner that at least one pair of the plane and the corrugated plates 31 and 32 is layered together and wound in cylindrical shape. The honeycomb carrier 30 formed in this way, is joined by means of laser welding, electric discharge welding, or soldering on its both end faces, so that all the contact portions between the plane and corrugated plates 31 and 32 layered together are joined at the ranges having width $1_1$, $1_2$ to be electrically shorted.

Electrodes (not shown) for applying electric power are provided at these portions $1_1$, $1_2$, each electrode is connected either to the controller 34 of a power source 4 or the ground.

Operation in the second embodiment will be hereinafter described.

An engine mounted at the up-stream side, is started up after the honeycomb carrier 30 according to the second embodiment is assembled as per the first embodiment in FIG. 4.

Unpurified gas is exhausted just after the start up, since temperatures of catalyst is still low. In this embodiment, an electric current is applied to the carrier 30 just before, at the same time, or just after the start up. The current flows from the end face to the end face of the carrier 30 along the flowing direction of the exhaust gas, and generates heat preferentially at its middle portion $1_3$, because slits are formed there to be high resistance. An increase in temperature is fast due to low thermal capacity and it reaches to the activation temperature of catalyst at a short time. Once it reaches to the preferred temperature, the heat is not easy to radiate to the adjacent exhaust pipe, housing due to the low thermal conductivity. Therefore, high regeneration effect is ensured.

However, the heat generation is preferentially produced at the middle portion 13, but not much at the portions having widths $1_1$, $1_2$, so that thermal stresses are concentrically created at the boundaries 17, 18.

The openings 33 at these boundaries $1_7$, $1_8$ are formed in a compact size in the second embodiment, so as to extend both of the remaining slit width $1_4$ and interval between openings $1_6$, respectively. Accordingly, the heat generation at the boundaries $1_7$, $1_8$ is an intermediate degree between the heat generations at the middle portion $1_3$ and portions having widths $1_1$, $1_2$.

Consequently, heat stress caused by a difference in heat generation between the portions of widths $1_1$, $1_2$, and the middle portion $1_3$, are relieved. According to the second embodiment, the honeycomb carrier 30 allows an improvement in durability against heat stress.

It also contributes to the effect mentioned above that a mild temperature gradient is provided with an intermediate value in electric resistance at the boundary portions $1_7$, $1_8$, and less heat generation at the portions than at the central portion $1_9$.

Consequently, the purification efficiency for exhaust gas is improved by quick activation, while the high durability is ensured.

Figure 15:
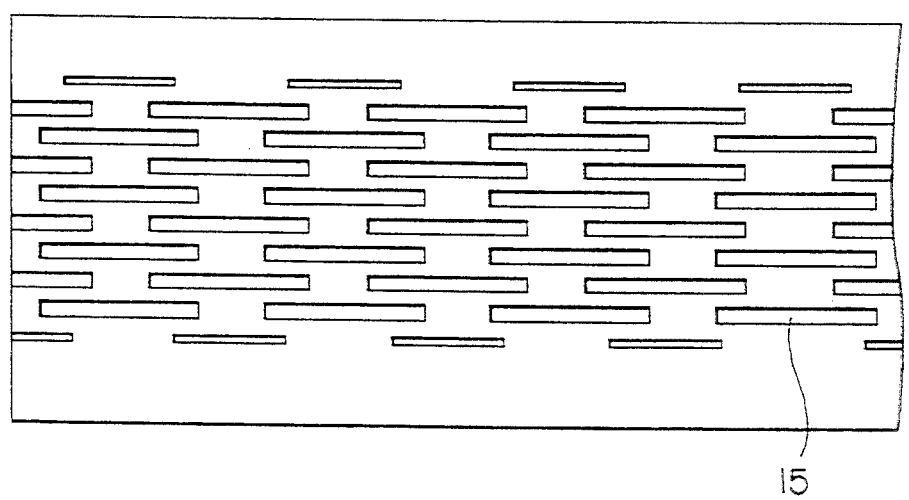
FIG. 15 is an illustration showing an embodiment of a slit shape on the plane or corrugated plate associated with the same second embodiment.
Figure 16:
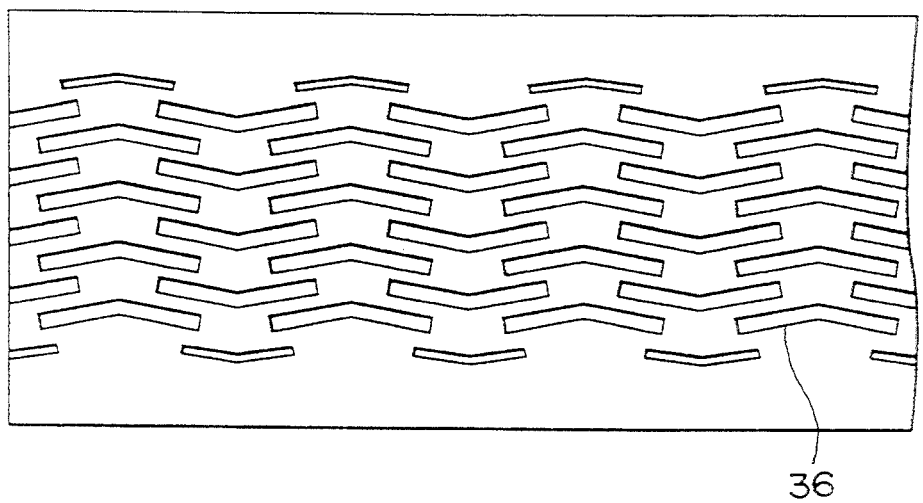
FIG. 16 is an illustration showing another embodiment of a slit shape on the plane or corrugated plate associated with the same second embodiment.

Though the slit has a diamond shape in the second embodiment, it is not limited to this shape. It may be a rectangular slit 15 as shown in FIG. 15, a bent-up line shaped slit 36 as shown in FIG. 16, or a curved slit.

Anyone of these slits can control its resistance value by a change in its width and interval between slits. However, the slits shown in FIG. 16 are more suitable than the other for obtaining high resistance.

These slits mentioned above are produced in arbitrary ways, such as etching, laser cutting, stamping by press machine, for example, a material is cut by cutting roller and then drawn or beaten to extend. Thus various other ways may be considered.

The honeycomb carrier 30 in the second embodiment, is produced in a manner that the plane and corrugate plates 31 and 32 are alternately layered and then wound to be a round honeycomb in a cross section, though, the present embodiment is not limited to this. The cross sectional shape can be freely selected depending on situation such as mounted positions.

The electrodes through which power is applied to the carrier 30, may have an arbitrary shape as far as a flow of exhaust gas is not prevented thereby, and it is considered other than bar-like electrodes that they may be a ring shape having widths $1_1$, $1_2$, respectively, to be fixed onto the cylindrical side face of the carrier 30. It may be also possible to employ bolt-shaped electrodes, so as to function in both ways as an electrode and a device to fix the carrier 30 on the housing.

When a honeycomb carrier 30 according to the second embodiment is employed instead of the self-heat generation type honeycomb carrier 1 as shown in FIG. 4, a heat insulator made of an inorganic fiber may be put into the gap between the housing (not shown) and carrier 30. This structure allows an improvement in heat insulating effect and electric insulation between the carrier 30 and housing, and further it supports the carrier 30 with its whole side face to improve the resistance against vibration.

When a thermal expansionable material (vermiculite) or the like is mixed with it, the supporting capability for the carrier is much more improved.

The honeycomb carrier 30 mentioned above, has $\gamma\text{-Al}_2\text{O}_3$ Wash-coated and catalyst supported thereon, so it has a function of purification itself. However, it may be also considered that this structure is made in a small volume of 100–200 cc as a sub-catalyst, and this is used in combination with a main catalyst made in a large volume and of metal or ceramic monolith. In this case, the main and sub-catalysts are arbitrary located. A structure in which a plurality of these catalysts are combined, may be employed for a large displacement engine.

(The third embodiment)

The third embodiment relates to a region at which a catalyst is supported on a self-heat generation type honeycomb carrier.

Figure 17:
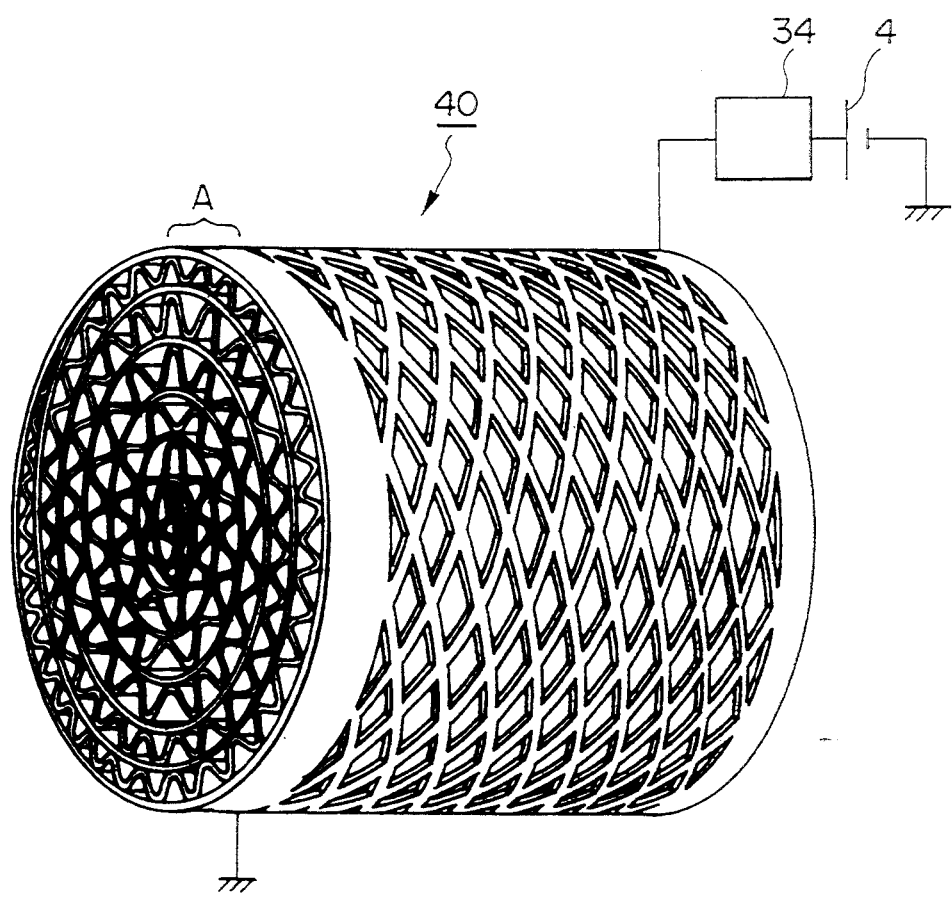
FIG. 17 is a schematic view of a catalytic carrier used for a self-heat generation type honeycomb filter associated with the third embodiment of the present invention.

FIG. 17 shows a honeycomb carrier 40 according to the embodiment, in which like reference characters denote like parts.

The honeycomb carrier 40 is formed in the same shape as the honeycomb carrier 1 shown in FIG. 1, and connected to a power supply 4 and a controller 34. An electric current is applied to the carrier 40 from the up-stream to down-stream or vice-versa along a flow of exhaust gas.

The region A in a range of a certain width 13 from the up-stream side end face, has not $\gamma\text{-Al}_2\text{O}_3$ Wash-coated and catalyst supported thereon in the third embodiment. This structure allows a reduction in thermal capacity for the carrier 40.

Operation in the third embodiment will be hereinafter described.

An engine mounted at the up-stream side (not shown), is started up after the honeycomb carrier 40 according to the embodiment is assembled as shown in FIG. 4.

When the main monolith 19 is activated just after the start up, an electric current is applied to the honeycomb carrier 40 to activate the catalyst supported in the honeycomb carrier 40.

This carrier 40 has porosity, so that high resistance and low thermal capacity are realized to raise the temperature of the carrier smoothly, though, the region A can reach to the activation temperature much faster, because the region A on which no catalyst is supported thereon, has lower thermal capacity.

Heat in the region A is conducted to the down-stream by thermal conduction and a flow of exhaust gas, to accelerate the increase in temperature and activation rapidly. The activation of catalyst is rapidly accelerated, so that the unpurified exhaust gas is extremely reduced in quantity.

Figure 18:
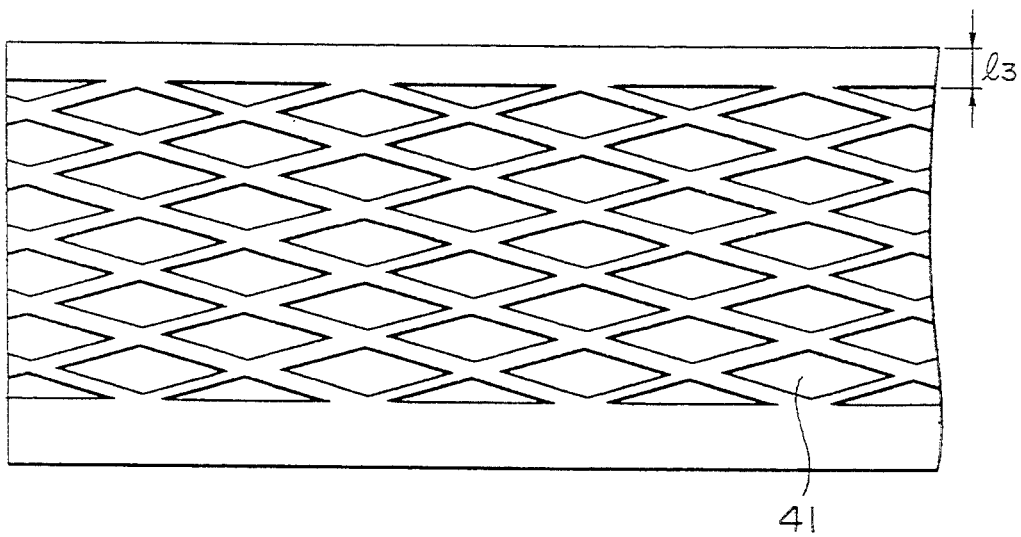
FIG. 18 shows an illustration showing an embodiment of a slit shape on the plane or corrugated plate associated with the same third embodiment.

A slit employed in the third embodiment may be a shape of a slit 41 shown in FIG. 18, other than shapes shown in FIG. 9, 10, 11, and 12 of the first embodiment.

(The fourth embodiment)

In the fourth embodiment, it is characterized that a part at which a plane plate and a corrugated plate are not joined together, is provided in the most outer circumferential region.

The fourth embodiment will be hereinafter described in detail.

Figure 19:
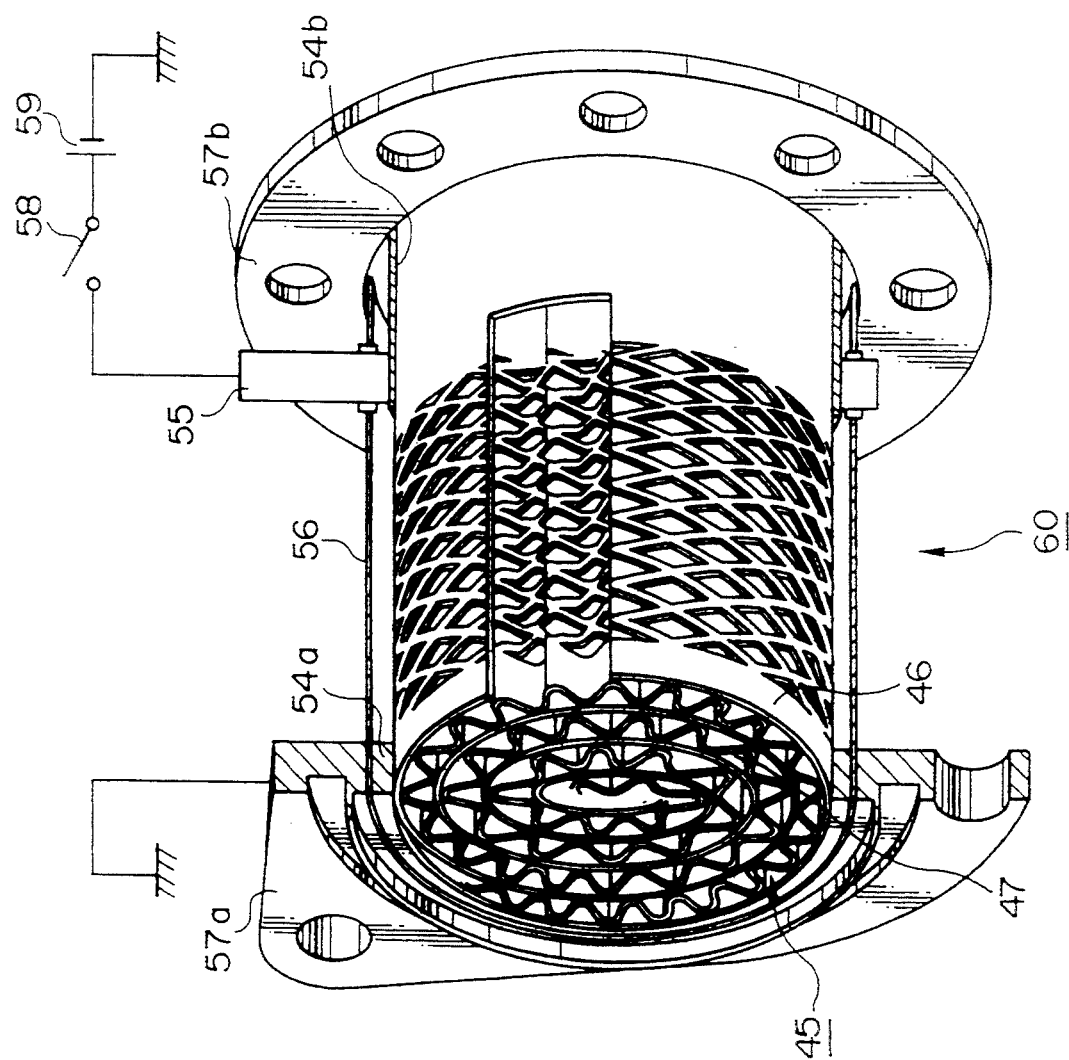
FIG. 19 is a schematic view of a catalytic carrier used for a self-heat generation type honeycomb filter associated with the fourth embodiment of the present invention.

FIG. 19 is a partial cross sectional view of a catalytic converter according to the fourth embodiment.

Figure 20:
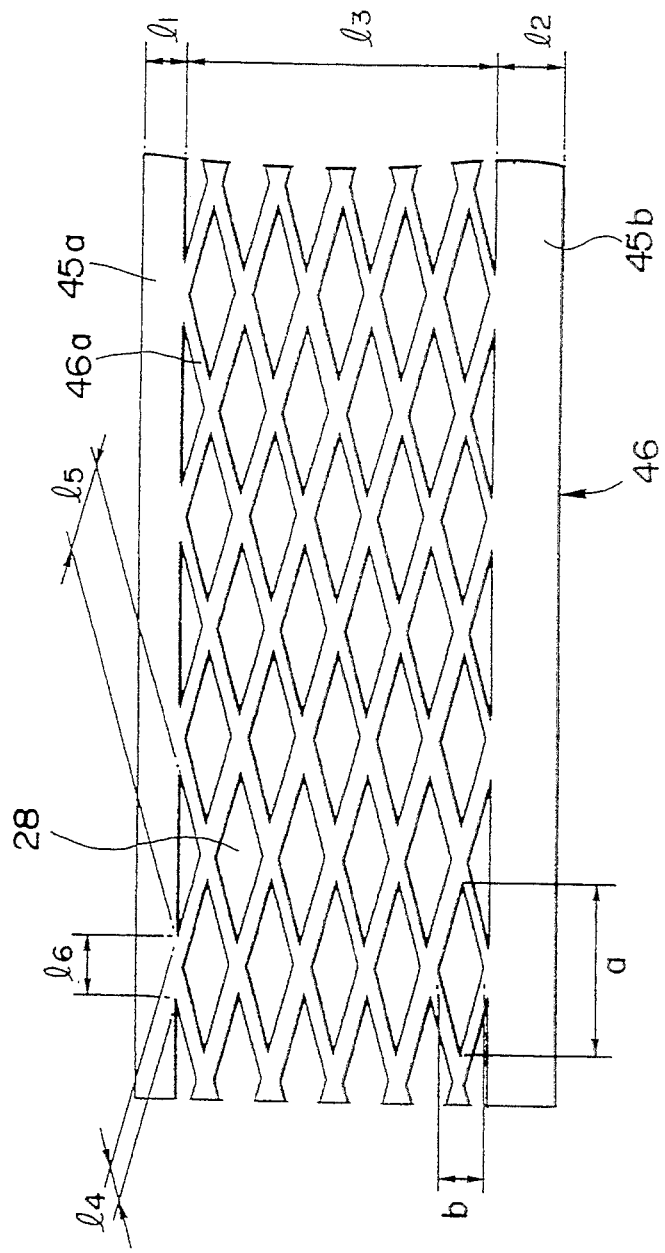
FIG. 20 is an exploded view showing a plane plate of the catalytic carrier associated with the same fourth embodiment.
Figure 22:
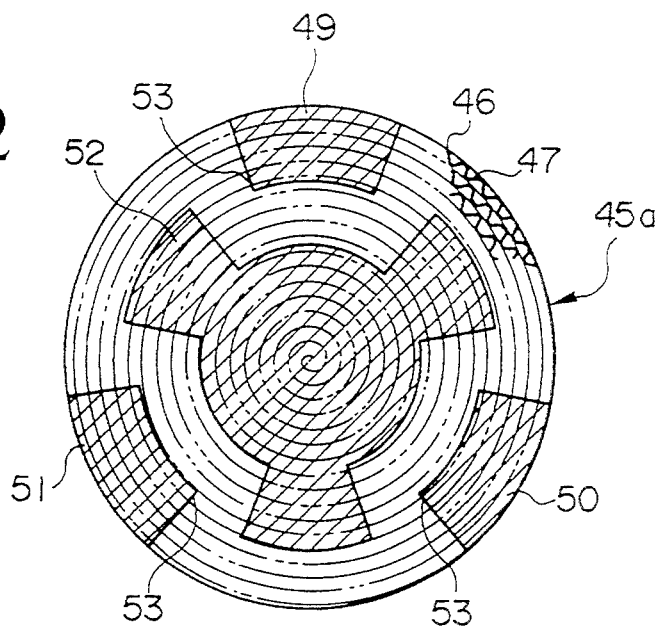
FIG. 22 is a front view showing a joining condition of the plane and corrugated plates associated with the same fourth embodiment.

A honeycomb carrier 45 is formed of a plane plate 46 and a corrugated plate 47. The first slits 46a are formed at the plane plate 46 as shown in FIG. 20, and the second slits 47a at the corrugated plate 47 as shown in FIG. 22.

The corrugated plate 47 has also the second slit part 47a formed in the same shape as the first slit part 46a formed at the plane plate 46.

The first and second slits 46a, 47a are provided between the down-stream side end portion 45a and up-stream side end portion 45b having widths $l_1$, $l_2$, respectively. A plurality of the first slits 46a are arranged in that each slit shaped in diamond has a horizontal length a and a vertical length b, and the position of the length a is shifted each other by a half of the length a; a/2.

In the fourth embodiment, the plane and corrugated plates 46a and 47a have the following dimensions: $l_1=10$ mm, $l_2=43$ mm, $l_3=25$ mm, $l_4=0.4$ mm, $l_5=45$ mm, $l_6=5$ mm, and b=0.4 mm.

A plane plate 46 is made of Fe-Cr-Al and has a thickness of 0.05 mm and a corrugated plate 47 is made of the plane plate 46 which is processed into a corrugated plate material having a wave height of 1.9 mm, a wave pitch of 3.75 mm. Then both two plates 46 and 47 are layered together and configured in round shape.

Figure 21:
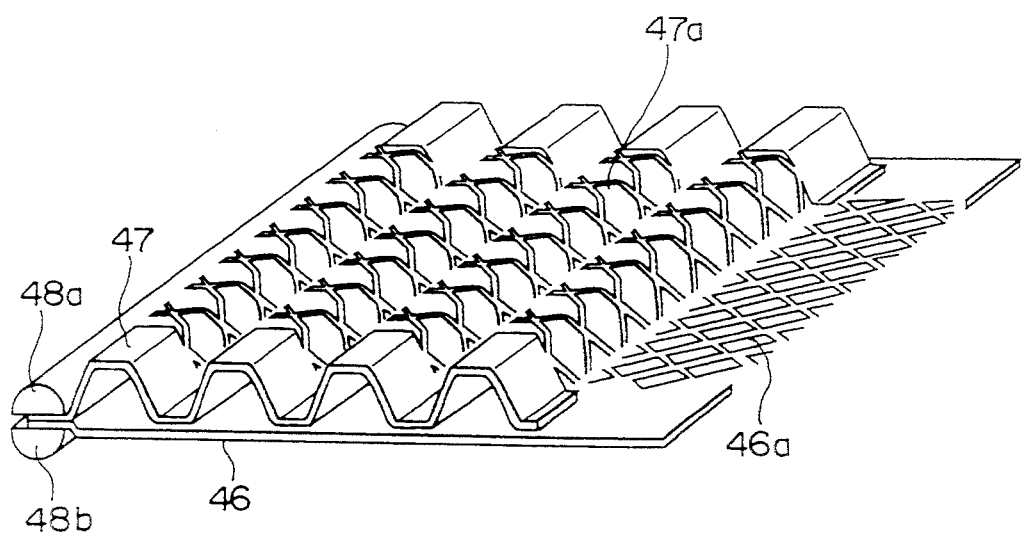
FIG. 21 is a schematic view showing a joining condition of the plane and corrugated plates associated with the same fourth embodiment.

As shown in FIG. 21, the plane and corrugated plates 46a and 47a are layered by means of semi-cylindrical winding tools 48a and 48b, so that the second slit parts 47a of the plate 47 and the first slit parts 46a of the plate 46 face each other. The tools 48a and 48b are rotated on its center to wind up the plates up to a predetermined dimension, and removed when the wound up plates reach to the required dimension.

The plane and corrugated plates 46, 47 are composed of Fe-Cr-Al material containing Cr; 18–24 wt %, Al; 4.5–5.5 wt %, rare-earth metal (REM); 0.01–0.2 wt %, and Fe; the rest of all, and shaped in belt having a thickness; t=0.03–0.05 mm.

After winding up, the honeycomb body wound by metal foil composed of the material mentioned above, is joined in a pattern as shown in FIG. 22. Then, it is heated up at the temperatures of 800° C.–1200° C. for 1–10 hours and processed in Wash-Coating, that is, it is impregnated into a slurry containing $\gamma\text{-Al}_2\text{O}_3$, and then baked. After that, it is impregnated into an aqueous solution in which a catalytic metal, for example, Pt or Ph is dissolved, and sintered again. As a result, a catalytic honeycomb carrier having $\gamma\text{-Al}_2\text{O}_3$ and catalytic substance adhered thereonto, is obtained.

Rings 54a, 54b are joined onto the honeycomb carrier 45 by means of laser welding or soldering as shown in FIG. 19. A catalytic converter 60 according to the fourth embodiment is provided by casing the carrier 45 with an electrode 55, an outer cylinder 56, flanges 57a and 57b. The converter 60 is mounted in the exhaust pipe line of an automobile.

The converter 60 is configured such that an electric current is applied to the honeycomb carrier in the axial direction to electrically heat it up by force, and activate catalyst and then purify noxious exhaust gas under idling condition just after an engine starts up.

Features according to the fourth embodiment will be hereinafter described.

It is characterized how the plane and corrugated plates 46 and 47 are joined after wound in round shape, and it will be described hereinafter with reference to FIG. 22.

Namely, FIG. 22 shows joined ranges on the end face 45a of the self-heat generation type catalytic converter 45.

Referring to FIG. 22, there are the first region 49, second region 50, third region 51, each being selectively joined by means of soldering, laser welding, electric discharge welding or the like, adjacent to the outer circumferential part shown by slant lines on the end face 45a of the honeycomb carrier 45, and the forth region 52 is also a joined part formed in the same manner on the central part.

As shown in FIG. 22, each of the first region 49, second region 50, and the third region 51, is selectively joined adjacent to the outer circumferential portion, and is joined only for a part of the length in both radial and circumferential directions.

On the other hand, at the central portion, the fourth region 52 is completely joined within a circular region which is almost equivalent to the half of a radius of the honeycomb body.

Namely, the welded ranges are, as a whole, orderly arranged from the center of the carrier 45 to the radial direction.

Each of the first region 49, second region 50, and third region 51 provided adjacent to the outer circumference, is joined to have overlapped regions 53, each of which is overlapped with at least one cell located within the circumference of the same radius as of the projections of the fourth region 52 provided at the center portion, facing other regions with non welded portions therebetween.

In the fourth embodiment, the following effects are provided with these regions joined in the way mentioned above.

Namely, when a catalytic converter 45 according to the embodiment is fixed in the exhaust pipe line of an automobile, thermal stress is produced during a heat-cycle process caused by rapid heating and cooling at the center portion of the honeycomb carrier when an engine start up and engine brake is applied, respectively. However, these thermal stress produced during the heat-cycle process is relieved by the converter 45 in which the non joined portion of the plane and corrugated plates 46, 47, which are provided adjacent to the outer circumference, are freely deformed in the radial and circumferential direction.

The thermal stress is produced by differences in the linear expansion coefficient, thermal capacity, and radiation area between the honeycomb carrier 45 and outer cylinder 56, rings 54a and 54b in FIG. 19.

This thermal stress is at a maximum adjacent to the outermost circumference where the difference in temperature distribution in the radial direction of the carrier 45 is also at a maximum. When a non-joined portion as in the fourth embodiment, is provided at a position where the maximum thermal stress is produced, it is efficiently relieved.

Namely, the smaller the joined area is, the greater the thermal stress is relieved, though it is weaker against vibration. That is, the greater the area is, the better the durability is. The selective joining method according to the present invention overcomes this contradictory problem.

Welded ranges are orderly arranged from the center of a honeycomb carrier to the radial direction, so that thermal stress is not concentrated on one part of the carrier.

Joined ranges are provided, facing each other with non-welded range therebetween, so that at least one cell located within the circumference of the same radius is overlapped. Thus, it can not be damaged or telescoped by vibration.

It is possible to fix the carrier just below the engine manifold where the carrier is exposed under the most severe conditions against thermal load and vibrations, though the temperature of exhaust gas is efficiently utilized to heat up the catalytic converter rapidly.

When a switch 58 is turned on, and an electric current is applied to both end faces of the carrier from a power supply 59, the plane and corrugated plates 46 and 47 configuring the carrier are heated up with the slits 46a, 47a formed thereat.

In this example, the portion of $1_4 \times 1_5$ is on the order of about 1.5Ω, and a high register about 0.25Ω is formed as a whole carrier. Thus, when power about 40 A at 10 V is applied after an engine start-up, the converter is heated up to a temperature of 450° C. about 10 seconds, and the catalytic substance is activated to purify exhaust gas.

In this case, the current, which flawed into the outer circumferential ring 54b of the carrier, when the switch 58 is on, further flows to the end faces of the carrier 45. The current further flows in the radial direction toward the center point at the joined regions adjacent to the outer circumference and in the circumferential direction at the non-joined region.

About a flow of the current in the central part, the number of points at which the plane plate 46 can contact with the irregular portions of the corrugated plate 47, decreases adjacent to the central portion, that is, the number of points at which welding is allowed, also decreases, so the current which flows into the radial direction, is decreased by the increase in resistance, due to non-welded portions presented at the central portion.

However, as in the fourth embodiment, almost all the central portion is a joined region, so the current from the outer circumference, flows into the honeycomb carrier 45 as if it is covered over thereby. Accordingly, the whole carrier 45 is evenly heated up to the central portion, where the flowing speed is high, so as to provide a high purification efficiency.

In the fourth embodiment as described above, a self-heat generation type honeycomb carrier has both resistances against thermal fatigue and vibration, and can achieve high purification efficiency.

Figure 23:
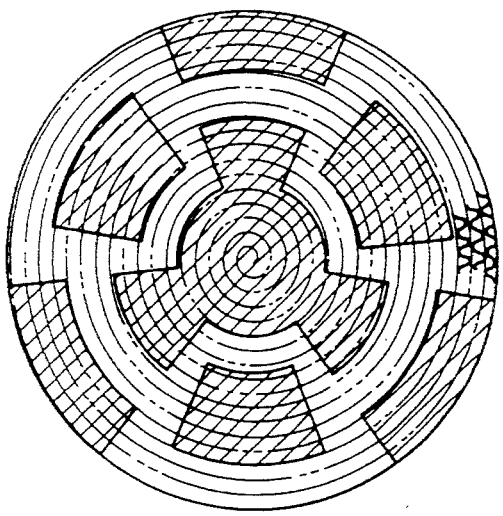
FIG. 23 is a front view showing another joining condition of the plane and corrugated plates associated with the same fourth embodiment.
Figure 24:
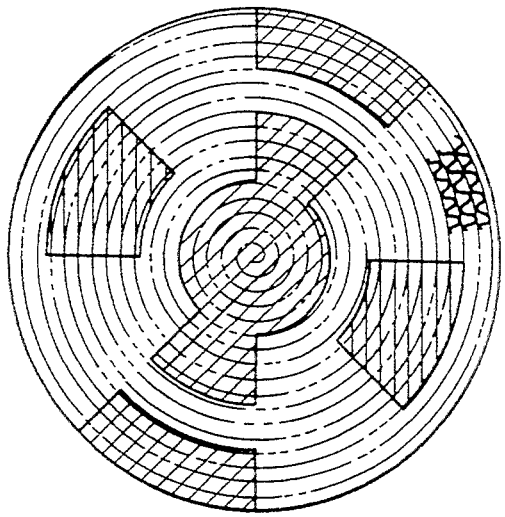
FIG. 24 is a front view showing still another joining condition of the plane and corrugated plates associated with the same fourth embodiment.

FIGS. 23, 24 shows other variations according to the fourth embodiment. In this embodiment, non-joined portions are further extended up to the central portion to relieve thermal stress. Much greater thermal stress is relieved by this structure.

Especially, FIG. 24 shows an example in that non-joined portions are extended in the circumferential direction to relieve more stress in the radial direction.

Slant lines in the drawing describe a joined region between a plane and a corrugated plates.

(The fifth embodiment)

The fifth embodiment relates to a method of producing a highly durable honeycomb filter.

In the embodiment mentioned above, as showing in FIG. 3, a plane plate 2 and a corrugated plate 3 is layered together, and then the end portions are held by winding tools 7a, 7b therebetween. The tools 7a, 7b are rotated on its center to wind up the both plates 2 and 3.

However, in the fifth embodiment, another production method will be hereinafter described.

Figure 25:
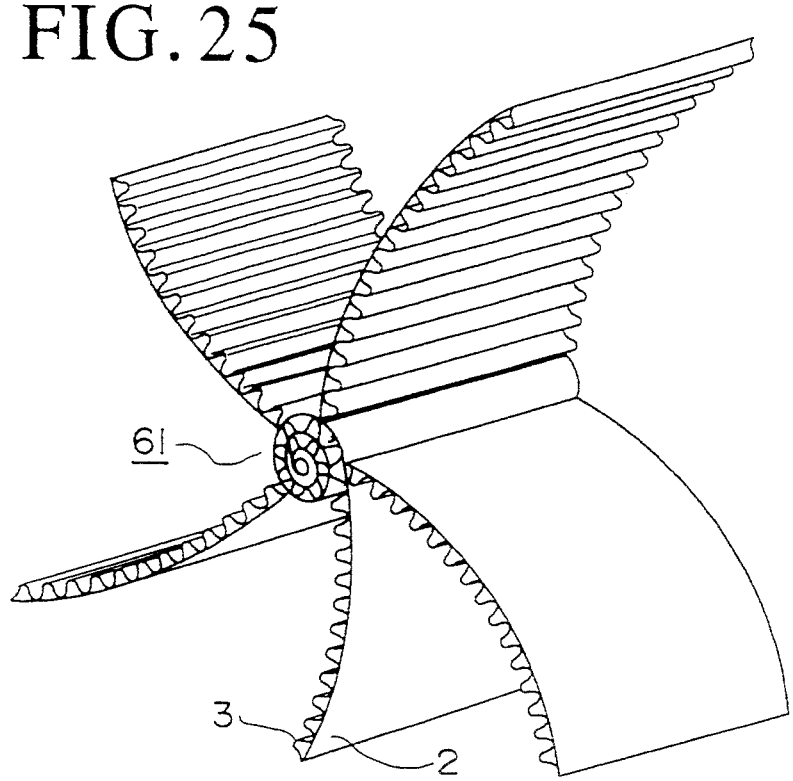
FIG. 25 is an exploded view of the plane and corrugated plates of the catalytic carrier associated with the fifth embodiment of the present invention.

FIG. 25 shows this embodiment applied to an electric heating type honeycomb filter.

As shown in FIG. 25, in the fifth embodiment, multiple set rolls of plane and corrugated plates are configured to improve the durability of a honeycomb filter to be produced. Only one or two sets of plane and corrugated plates 2, 3 are wound about three or four times when an initial winding starts, then four to eight sets of plates 2, 3, are joined radially onto the core body 61 composed of the one or two sets of plates 2, 3, wound together, and the joined sets are wound up to the outermost circumference to have the configuration of a multiple set roll, so that its machinability and purification capacity is still kept.

According to the fifth embodiment, a length of metal foil per one set of plates 2, 3, is reduced, the thermal expansion per set is also reduced, and the deformation thereof caused by the stress vertical to the longitudinal direction of the metal foil can be deteriorated, so as to improve its durability (resistance against telescoping). One or two sets of plane and corrugated plates 2, 3 are wound about three or four times to form a core when an initial winding starts, so as to join and wind a multiple set of plates 2, 3, onto the core., Consequently, the plates 2, 3 are radially joined and wound onto the core much easier than onto a very thin central portion. Further, cells are prevented from being crushed, the plane and corrugated plates 2, 3 can be prevented from concentrating at a central portion thereof so as to break the machinability, and an increase in pressure loss is prevented.

There is no decrease in purification area and purification capacity is not easily damaged, because the central portion, in which the stream and temperature of exhaust gas are highest and efficient purification is performed, is not crushed.

According to the description above, it is possible to provide a honeycomb filter having high durability (high telescoping resistance), preferred machinability, and high purification capacity.

It will be readily appreciated that this production method is not only limited to the application to a self-heat generation type honeycomb filter, but also it is applicable to any honeycomb filter which is not a self-heat generation type.

(The sixth embodiment)

The sixth embodiment relates to a joining condition between the plane and corrugated plates.

The sixth embodiment will be hereinafter described in detail.

Figure 26:
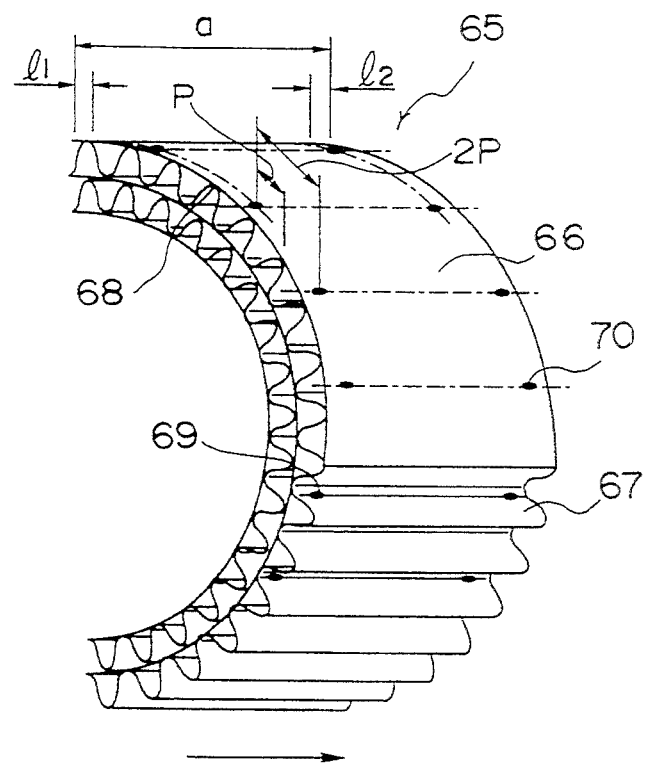
FIG. 26 is an illustration showing a catalytic carrier associated with the sixth embodiment of the present invention.

FIG. 26 is a type schematic view showing a honeycomb carrier 65 according to the sixth embodiment.

The honeycomb carrier 65 is configured of a plane plate 66 and a corrugated plate 67, alternately wound, each plate being shaped in belt. After that, the plane plate 66 and corrugated plate 67 are laser-welded at intervals of 2 pitches, in the all winding range where the plane plates 66 make in contact with the peak 68 and trough 69 of the corrugated plate 67, respectively, where a pitch is a interval between peaks (or troughs) on the corrugated plate. This joined point is provided adjacent to both end faces of the carrier 65, respectively, and 2 points in total are laser-welded at like peak 68 and like trough 69, respectively, along the axial direction.

Welded marks 70 after a honeycomb filter is laser-welded, are shown in FIG. 26.

This honeycomb carrier 65 is composed of Fe-Cr-Al material containing Cr; 18–24 wt %, Al; 4.5–5.5 wt %, Rare-earth metal (REM); 0.1–0.2 wt %, and Fe; the rest of all, and the material is shaped in belt and its thickness; $t=0.03–0.05$ mm.

A corrugated plate 67 has a wave height of 1.25 mm, a wave pitch P of 2.5 mm.

A honeycomb carrier 65 has a diameter of 86 mm, and a axial length $a=14$ mm.

All of welding positions $l_1$ and $l_2$ are 1.5 mm.

Effects according to this structure will be hereinafter described.

Consequently, non-joined portions are provided at intervals of 2 pitches of a corrugated plate 67, so that for example, when thermal stress is produced in the circumferential and radial directions, and further in the axial direction of the carrier 65, during heating and cooling cycle in which temperatures vary severely between 900° C. and 25° C., it is relieved at the non-joined part.

This thermal stress is produced by an outer cylinder made of stainless steel, and mounted at the carrier 65, because the carrier 65 is restricted by the cylinder.

However, in the configuration according to the sixth embodiment, the corrugated plate can be freely modified at the non-joined parts of the plane and corrugated plates 66, 67 and the carrier 65 is held by containing honeycomb carrier 65 and this metal honeycomb carrier 65, so that thermal stress produced between an outer cylinders (not shown) is relieved in the inner carrier 65.

Accordingly, high thermal fatigue resistance is ensured.

Joining at two spots adjacent to both end faces along the axial direction of the carrier 65, allows an improvement in the rigidity of the carrier 65 itself, because the resonance frequency of the carrier 65 is kept at an extremely high level.

According to the configuration mentioned above, the peaks 68 and toughs 69 of the corrugated plate 67 to be joined, are formed at intervals of 2 pitches all over the region, so that the plane and corrugated plates 66 and 67 are successively joined at a certain interval, while the plates are wound.

This method can simplify the control of tools for joining.

(The seventh embodiment)

In the seventh embodiment, the joining method of the sixth embodiment, is applied to a honeycomb carrier 71 having a slit region 76 provided at the plane and corrugated plates 72 and 73 shown in the first embodiment.

Figure 27:
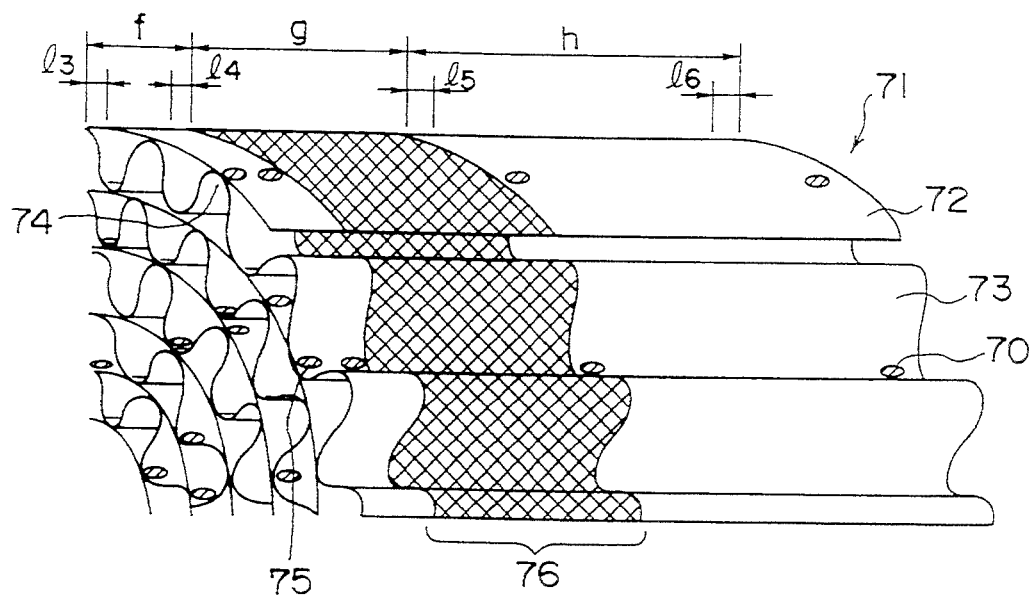
FIG. 27 is an illustration showing a catalytic carrier associated with the seventh embodiment of the present invention.

As shown in FIG. 27, joining spots between the plane plate 72 and corrugated plate 73 forming a carrier 72, are laser welded at intervals of 2 pitches, where the plane plate 72 has a contact with the peaks 74 and troughs 75 of the corrugated plate 73, respectively, in the all winding range, where a pitch is a interval between peaks (or troughs) of the corrugated plate.

In the seventh embodiment, two joining spots between plates 72 and 73 are not only provided at both up and down stream sides, but also further laser-welded at like peak 74 and like trough 75, respectively, with the slit region 76 therebetween, along the axial direction as shown in FIG. 27.

A material used for the plane and corrugated plates 72 and 73 mentioned above, is the same as used in the first embodiment.

The honeycomb carrier 71 has dimensions; 66 mm in diameter and 78 mm in length of axial direction.

Welding positions from $l_1$ to $l_6$ are all 1.5 mm.

Figure 28:
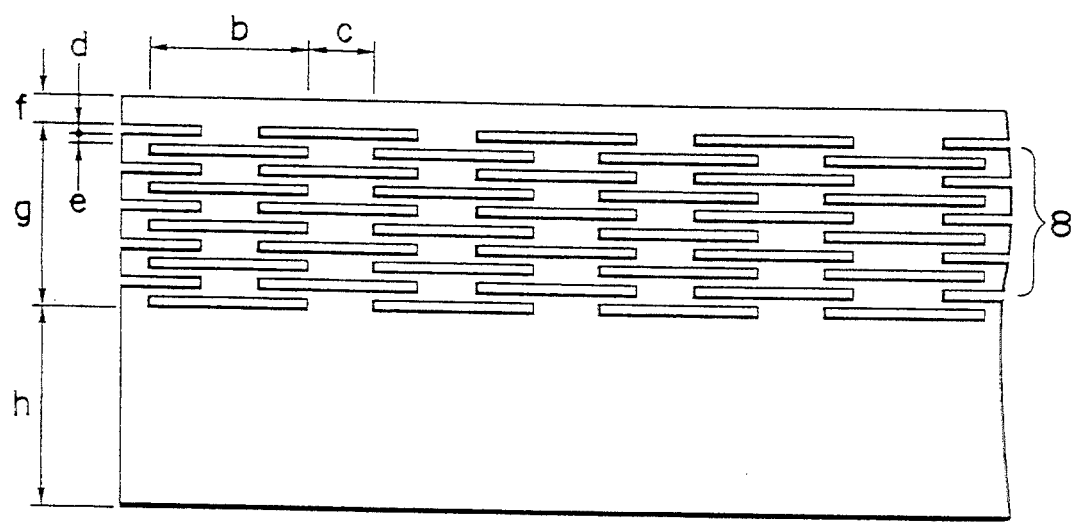
FIG. 28 is an exploded view showing the plane plate of the catalytic carrier associated with the same seventh embodiment.

The slit region 76 is formed as shown in FIG. 28.

Each dimension: $b=45$ mm, $c=5$ mm, $d=0.4$ mm, $e=0.4$ mm, and Overall length $g=25.2$ mm.

Further, there are regions having f=12 mm at the up-stream side of exhaust gas, and h=40.8 mm at the down-stream side, where no slit region 76 is provided.

This slit region 76 is provided, such that an electric current is applied between both end faces of the carrier 71 in the axial direction to heat it up. The overall resistance value of the carrier 71 is 0.25Ω in the seventh embodiment, so that an electric power of 400 W at 10 V is allowed to apply.

Figure 29:
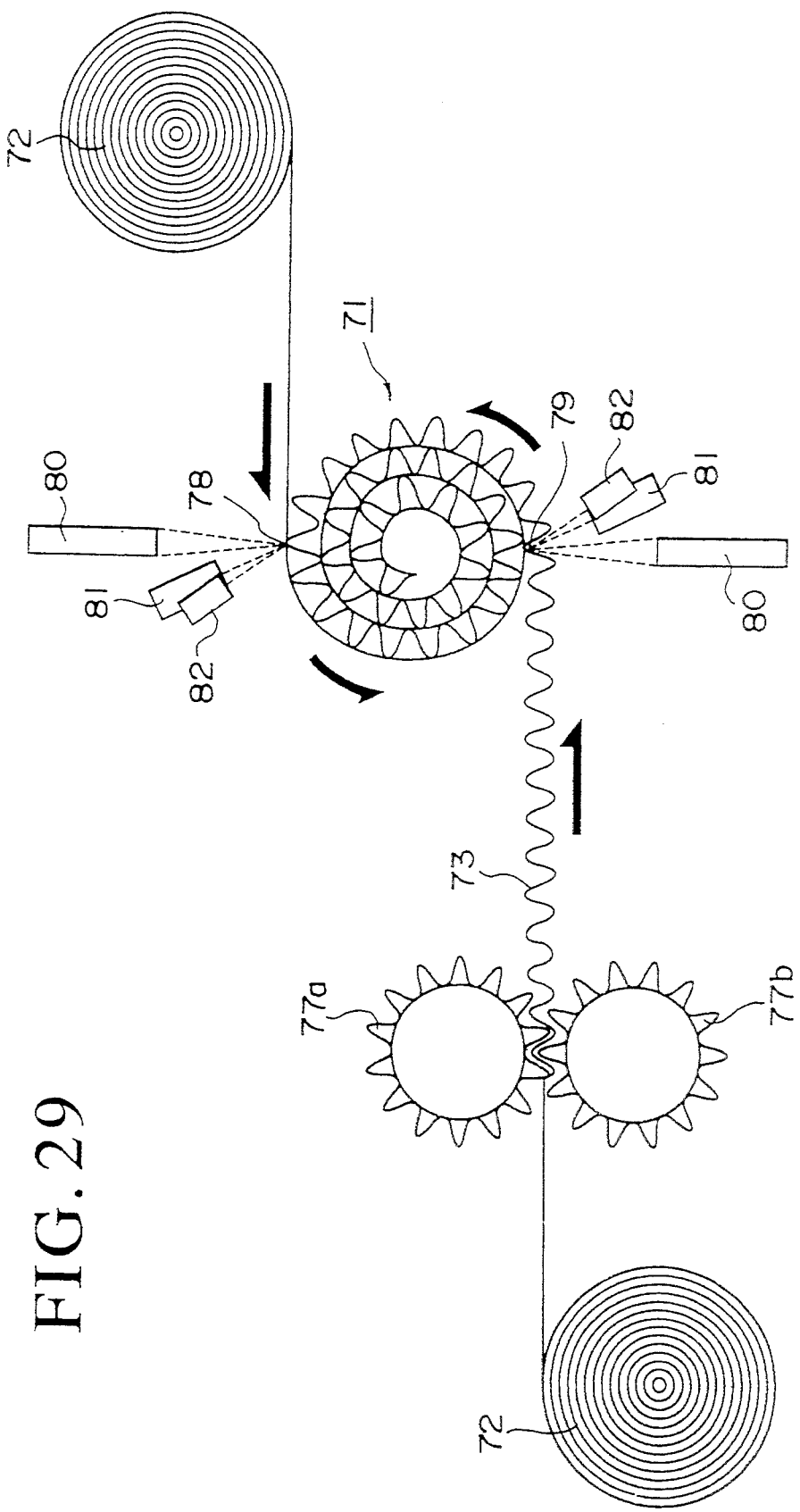
FIG. 29 is a schematic view of an apparatus for making the catalytic carrier associated with the same seventh embodiment.

Welding method according to the seventh embodiment will be hereinafter described in detail by reference to FIG. 29.

One out of two rolls of stainless foil, each of which is formed of a plane plate 72 cut in a predetermined width and wound in roll shape in advance, is fed between gears 77a, 77b to form a corrugated plate 73.

This corrugated plate 73 is placed over the other plane 72 plate and wound together.

Further, two beams of laser are irradiated by YAG laser heads from two directions on the extended diagonal line on a section perpendicular to the axial direction of the carrier, while the winding process is performed. Without suspension of winding operation, the peaks 78 of the corrugated plate are joined by one of the laser head, and toughs 79 of the plate 73 are by the other one, respectively together with the plane plate 72 which has a contact with the plate 73.

This laser welding should be performed at positions where the plate 72 is in contact with the plate 73, so that the positions are detected. Laser displacement sensors 81 and eddy-current displacement sensors 82 are provided for the production apparatus. Consequently, the plates are wound and joined successively without suspension of winding operation once winding process starts, while the position is detected and laser focal distance is corrected.

Namely, the laser displacement sensor 81 detects a gap between the laser head 80 and metal honeycomb carrier 71 and sends signals to a servo-motor (not shown) to move the laser head 80.

The eddy-current displacement sensor 82 detects the peaks 78 and toughs 79 of the plate 73, and YAG laser beams are irradiated in accordance with the detected signals.

The plane and corrugated plates 72 and 73 are precisely laser-welded by this way of control mentioned above.

Figure 30:
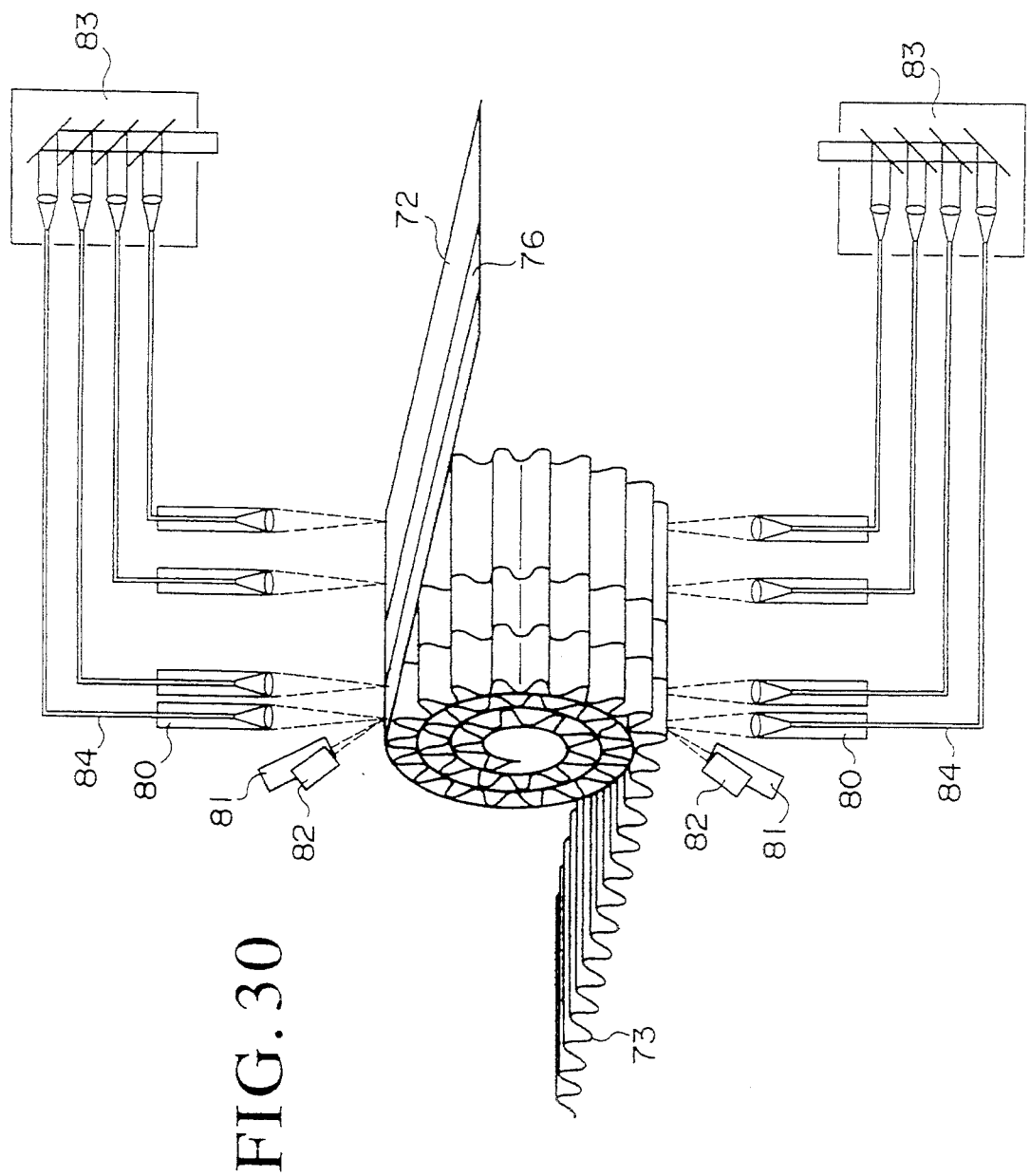
FIG. 30 is a schematic view of the main part of the apparatus for making the catalytic carrier associated with the same seventh embodiment.

FIG. 30 shows an illustration of laser welding.

That is, FIG. 30 shows a laser joining carried out at four spots in the axial direction.

YAG laser is divided into four beams by half mirrors 83 and sent to laser heads 80 through fiber cables, respectively, to allow this four-spots laser joining.

Other production methods such as a method of making a honeycomb carrier 71 hold catalyst therein, are the same as in the first embodiment.

As mentioned above, laser beam is divided, so as to increase the number of joining spots easily.

With this configuration, the same effect as in the sixth embodiment are obtained.

In the seventh embodiment, a rigid honeycomb carrier 71 is provided, because welding is made at positions facing each other with slit region 71 therebetween.

According to the configuration as mentioned above, the peaks 74 and toughs 75 of the corrugated plate 73 to be joined are formed at an interval of 1 pitch all over the region, so that the plane and corrugated plates 72 and 73 are successively joined at a certain interval, while the both plates are wound. This method can simplify the control of tools for joining.

For example, the laser joining as shown in FIG. 28, can be performed without suspension of winding operation.

Joining operation is easily carried out without any special complicated devices, even when both plates 72 and 73 are joined by soldering, because soldering material can be just only put on the plates at a certain interval.

(The eighth embodiment)

In the present embodiment, another embodiment of the joining methods according to the sixth and seventh embodiments, will be described by reference to FIG. 31, 32, 33, and FIG. 34.

Figure 31:
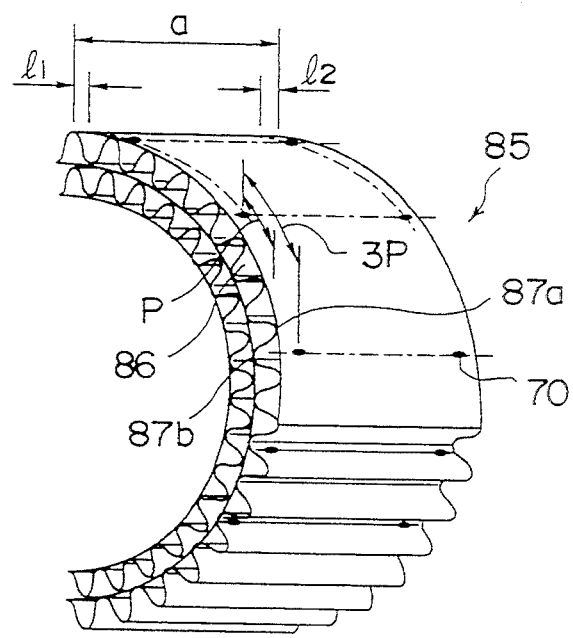
FIG. 31 is a schematic view showing a connected condition of the plane and corrugated plates of the catalytic carrier associated with the eighth embodiment of the invention.

At intervals of 3 pitches of a corrugated plate 86, 2 spots at like peak 87a and like trough 87b, respectively, are joined adjacent to both end faces of a honeycomb carrier 85 shown in FIG. 31, along the axial direction of the carrier 85.

The structure as mentioned above can provide a honeycomb carrier durable against much severe thermal stress.

Figure 32:
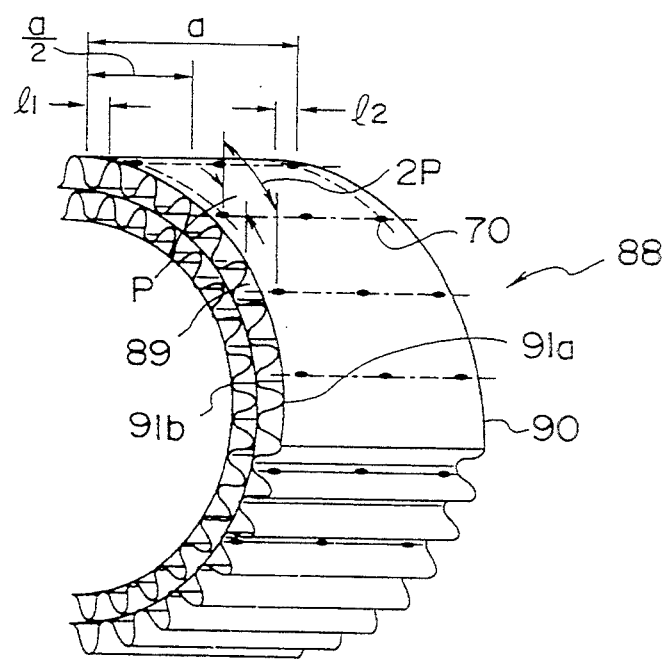
FIG. 32 is a schematic view showing another connected condition of the plane and corrugated plates associated with the same eighth embodiment.

A honeycomb carrier 88 in FIG. 32 has a joining part adjacent to the central portion in the axial direction of the carrier 88, in addition to the joining parts described in the sixth embodiment.

Namely, at intervals of 2 pitches of a corrugated plate 89 of a honeycomb carrier 88, like peak 91a and like trough 91b, are joined to a plane plate 90, respectively, adjacent to both end faces and central portion.

The structure as mentioned above can provide a honeycomb carrier durable against much severe thermal stress.

Figure 33:
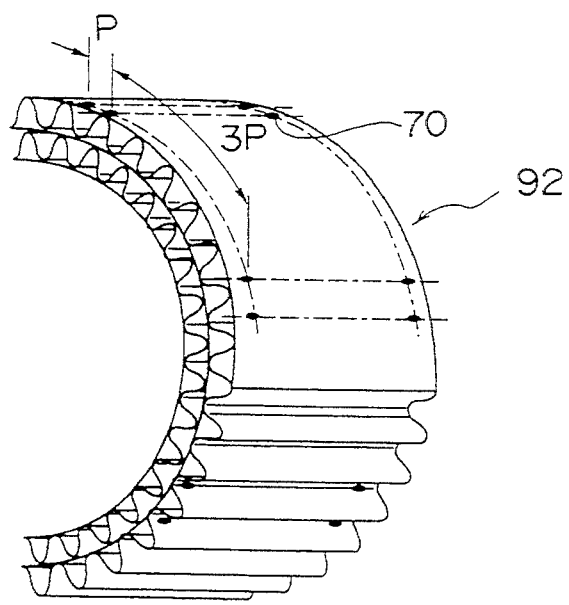
FIG. 33 is a schematic view showing still another connected condition of the plane and corrugated plates associated with the same eighth embodiment.
Figure 34:
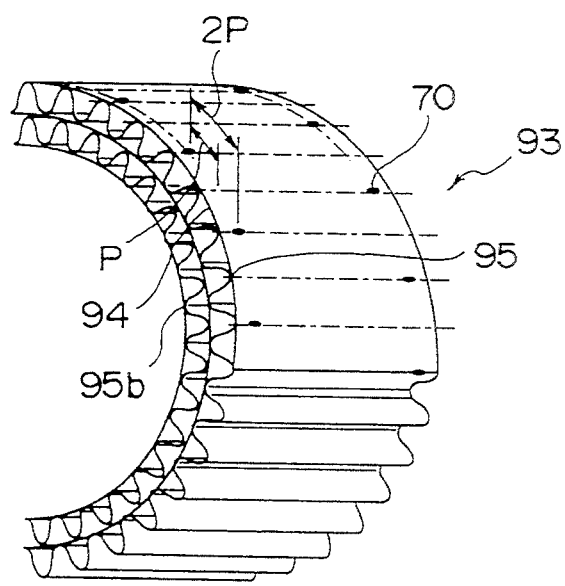
FIG. 34 is a schematic view showing still another connected condition of the plane and corrugated plates associated with the same eighth embodiment.

Joining at intervals of 3 pitches after two-spots welding as shown by welding marks 70 is carried out in a honeycomb carrier 92 shown in FIG. 33.

As shown by welding marks 70, a peak 95a and a trough 95b are not joined to a plane plate 94 at like peak 95a and like trough 95b, respectively, along the axial direction of a honeycomb carrier 93.

The structure as mentioned above can provide a honeycomb carrier still durable against much severe thermal stress.

(The ninth embodiment)

In the ninth embodiment, it is characterized that joining between the plane and corrugate plates varies in a joining rate at the positions adjacent to the central portion and circumference of a honeycomb carrier, respectively.

The configuration of a honeycomb carrier 100 other than the change in joining rate, is the same as the honeycomb carrier 71 shown in FIG. 27, so that description about the configuration is omitted, and only features according to the present embodiment will be described.

Figure 35:
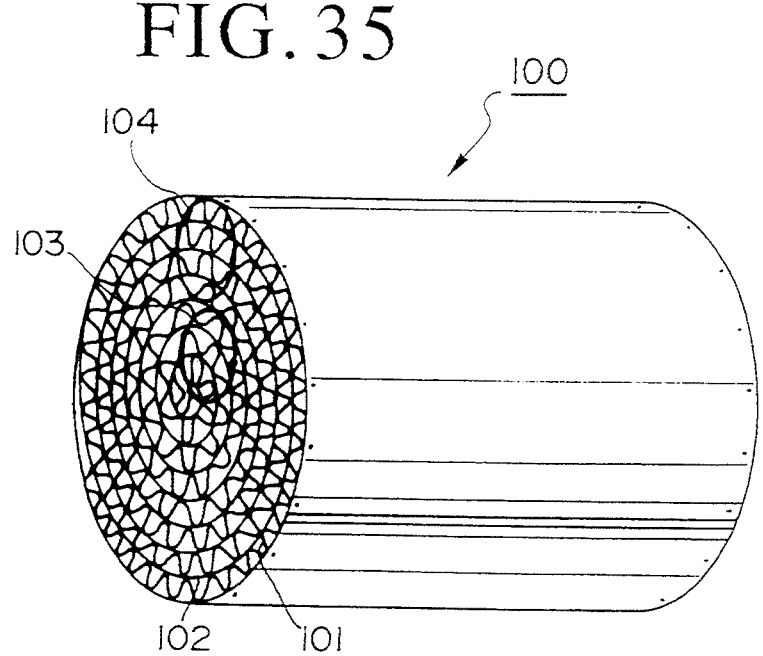
FIG. 35 is an illustration of a catalytic carrier associated with the ninth embodiment of the invention.

FIG. 35 shows a honeycomb carrier 100 according to the ninth embodiment.

This carrier 100 is provided in a manner that a plane plate 101 and a corrugated plate 102 are layered and wound together.

Figure 36A:
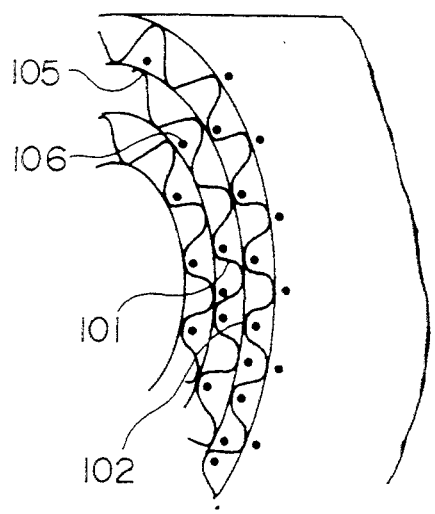
FIGS. 36A and 36B are type schematic views showing the connected conditions of the carrier associated with the same ninth embodiment.
Figure 36B:
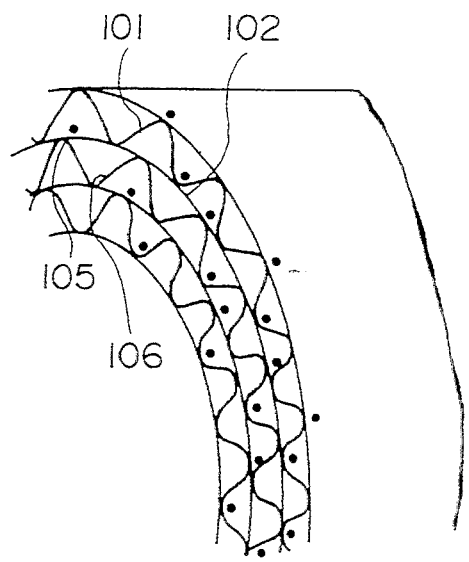

FIG. 36(a) shows a partly enlarged view of the central region 103 of the carrier 100. FIG. 36(b) shows a partly enlarged view of the outer circumferential region 104 of the carrier 100.

As shown in FIG. 36(a), all peaks 105 and troughs 106 of the corrugated plate 101 which are in contact with a plane plate 102 are laser joined in the central region 103.

As shown in FIG. 36(b), peaks 105 and troughs 106 of the corrugated plate 101 which are in contact with a plane plate 102 are laser joined at intervals of 2 pitches in the outer circumferential region 104.

The joining at intervals of 2 pitches is carried out in the same manner as in the sixth embodiment.

A method of producing the honeycomb carrier 100 according to the ninth embodiment is the same as in the sixth and seventh embodiments.

Namely, in the ninth embodiment, it is characterized in that a plane plate 102 and a corrugated plate forming the carrier 100, are changed in joining rate therebetween in the central region 103 and outer circumferential region 104, especially it is configured that a joining rate is higher in the outer circumferential region than in the central region 103.

When joining is made at intervals of 2 pitches, as in the sixth embodiment, sufficient strength can not be obtained, because the circumferential length is short in the central region 103, that is, the number of joining points per round is low.

However, in the ninth embodiment, all of the points at which the plane and corrugated plates are in contact with each other, are joined in the central region 103, such that sufficient rigidity is obtained.

There is not much affected by thermal stress in the central region 103, so that all welded parts have a sufficient durability against thermal stress.

On the other hand, the circumferential length per round is long enough in the outer circumferential region 104, so sufficient strength can be maintained, even when joining is made at intervals of 2 pitches. Further, the structure by joining at intervals of 2 pitches, can improve the strength against thermal stress, which is an effect provided in the sixth embodiment. Other effects of the sixth embodiment are also provided by the configuration in the ninth embodiment.

(The tenth embodiment)

Figure 37:
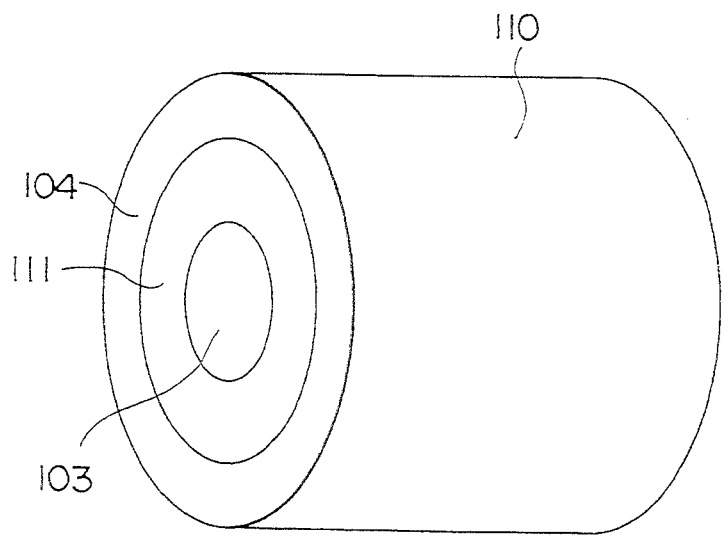
FIG. 37 is a schematic view of a catalytic carrier associated with the tenth embodiment of the invention.
Figure 38:
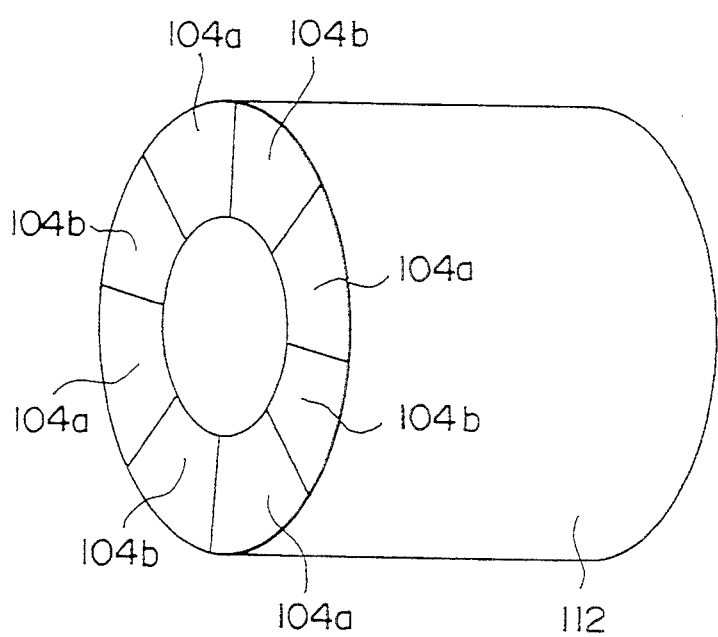
FIG. 38 is a schematic view of a catalytic carrier associated with the eleventh embodiment of the invention.

FIG. 37 shows a honeycomb carrier 110 according to the tenth embodiment.

In the ninth embodiment, it is configured that joining rate between the plane and corrugated plates 101 and 102 is higher in the central region 103 than in the outer circumferential region 104.

In the tenth embodiment, a middle region 111 other than the central and outer circumferential regions 103 and 104, is additionally formed.

It is configured that the middle region 111 has an intermediate joining rate between the central and outer circumferential region 103, 104.

This configuration allows an improvement in durability for a honeycomb carrier 110 itself, and an decrease in joining rate between the plane and corrugated plates to simplify the production method.

(The eleventh embodiment)

FIGURE shows a honeycomb carrier 112 according to the eleventh embodiment.

In the tenth embodiment, the outer circumferential region 104 in the ninth embodiment is further divided into two regions as the first and second outer circumferential regions 104a and 104b, respectively.

Namely, a plane plate and a corrugated plate (not shown) are joined at an interval of a pitch in the central and first outer circumferential region 104a. They are joined at intervals of two pitches in the region 104a.

This configuration facilitates to set soldering material in joining operation of the corrugate and plane plates by soldering.

(The twelfth embodiment)

In the twelfth variations, another embodiment in the ninth, tenth, and eleventh embodiments, will be hereinafter described.

In the ninth embodiment, all peaks 105 and troughs 106 in the central region 103 are joined with the plane plate 101, and they are joined at an interval of one pitch in the outer circumferential region 104.

However, the plane and corrugated plate 101 and 103 may be joined at intervals of two pitches in the central region 103, and at intervals of three pitches in the outer circumferential region 104.

Further, the peaks 105 and troughs 106 of the corrugated plate 101 are joined respectively at a interval of one pitch and intervals of two pitches in the central region 103. Namely, two peaks 105 out of three peaks 105 and two troughs 106 out of three troughs 106 of the corrugated plate 101 are joined. The peaks 105 are joined alternately by every one peak and two peaks with the plane plate 102 in the outer circumferential region 104. The troughs 106 may be also joined alternately by every one trough and two troughs.

(The thirteenth embodiment)

Figure 39:
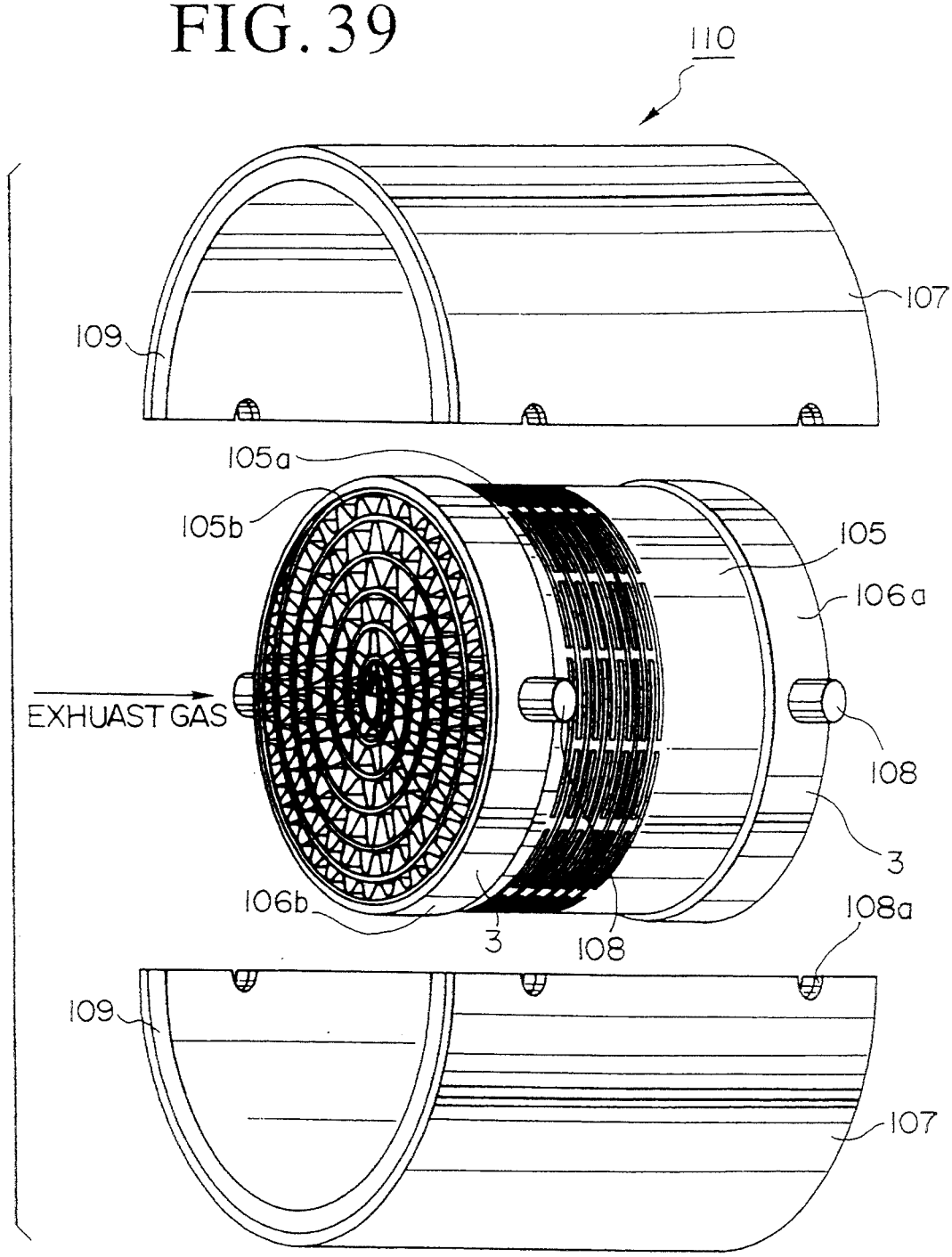
FIG. 39 is an exploded, perspective view of a catalytic converter utilizing a catalytic carrier associated with the thirteenth embodiment of the invention.

FIG. 39 shows the thirteenth embodiment.

The present embodiment relates to a method of holding an outer cylinder containing a honeycomb carrier according to the embodiment mentioned above.

The thirteenth embodiment will be hereinafter described in detail.

A honeycomb carrier 105 with catalyst supported therein is the same configuration as the honeycomb carrier 1 according to the first embodiment.

Rings 106a and 106b which become base when fixed, are joined at end portions 105b having no slits 105a of the carrier 105, as shown in FIG. 39.

These rings made of stainless steel plate with a thickness of more than 1 mm, are joined completely or partly to the both end portions 105b of the carrier 105 by means of soldering, laser-welding, or spot welding.

The carrier 105 having a function as a catalytic converter is provided through a series of procedures for the catalytic honeycomb carrier such as r, aluminum coating after the rings 106a and 106b are joined.

Two bar-like supporting members 108, are joined into the ring 106a and 106b on the up-stream and downstream sides, respectively, so as to fix the carrier 105 and outer cylinder 107 by four members in total.

The outer diameter of the cylinder 107 is greater than of the carrier 105, rings 106a and 106b. The cylinder 107 is divided into two portions at the side face in accordance with the number of the supporting members 108 and their locations to be fixed. Notches 108a are formed at positions which are in contact with the members 108 of the cylinder 107, so as to facilitate to fix the members 108.

This structure make it possible to assemble a catalytic converter easily.

Filler 109 having adiathermanous, air-tightness, and buffer action, is provided onto the inner wall of the cylinder 107, so that problems such as vibrations of the carrier 105 by a flow of exhaust gas and an engine, blowing-through of unpurified gas, and thermal radiation from the carrier 105, are reduced or overcome.

The use of the filler 109 accelerates an improvement in durability and purification capacity.

Operation according to the thirteen embodiment will be hereinafter described.

When exhaust gas from an engine (not shown) comes into the catalytic converter 110 according to the thirteen embodiment, the honeycomb carrier 105 is heated up to be a high temperature state by temperatures of the gas itself and catalytic reaction.

A normal honeycomb carrier 105 has no expandability on its own. Such carrier 105 is rigidly joined to the cylinder, so stress caused by thermal expansion acts on the carrier to produce telescoping and deformation of the honeycomb body.

The temperature distribution caused by a difference in thermal capacity between the honeycomb carrier and outer cylinder is also affected on the decrease in durability.

However, in a method of holding the carrier 105 with the cylinder 107 in the thirteenth embodiment, thermal expansion of the carrier 105 is absorbed by slits 105a formed at the carrier 105, so as to reduce the production of stress.

Further, heat by the thermal conductivity from the carrier 105 to cylinder 107, is conducted only through the thin supporting members 108, so the thermal capacity is extremely small, and the thermal distribution in the carrier 105 can be also maintained to be small. Therefore, high durability is realized with both method and slits 105a provided for the carrier 105.

On the other hand, catalytic element is not yet activated yet and unpurified gas is exhausted when catalyst is cold just after start up, though, the unpurified gas will be reduced to improve the purification efficiency as a whole, if the activation speed is more accelerated.

As in the thirteenth embodiment, if the slits 105b are formed at the carrier 105, thermal capacity will be reduced to hasten the increase in temperature from idling condition and improve the purification performance with the thermal conductivity to the cylinder 107 kept in low level.

(The fourteenth embodiment)

Figure 40:
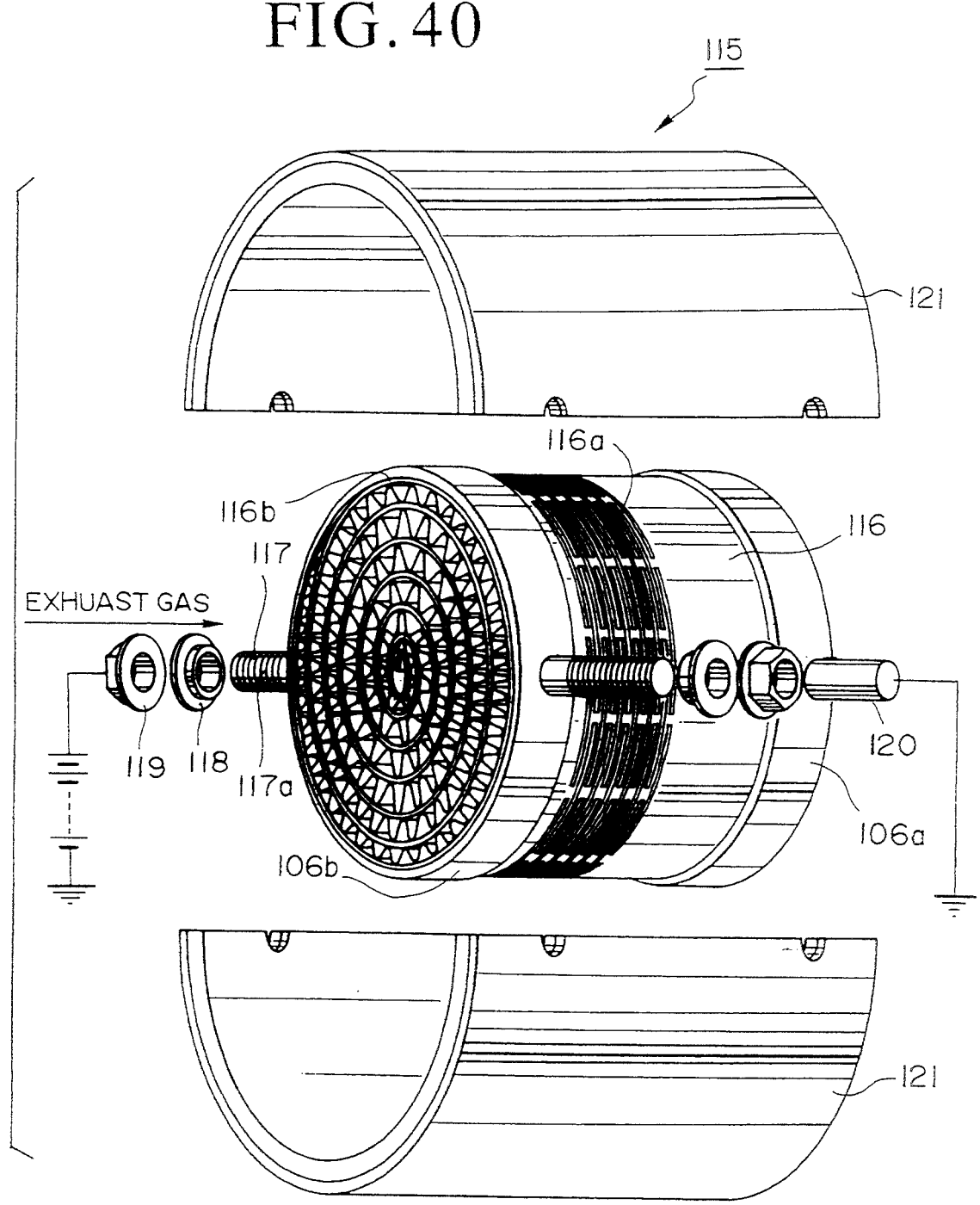
FIG. 40 is an exploded, perspective view of a catalytic converter utilizing a catalytic carrier associated with the fourteenth embodiment of the invention.

FIG. 40 shows an example applied to a self-heat generation type converter 115.

Slits 116a are formed at this self-heat generation type honeycomb carrier 116, and rings 106a and 116b which are used in the thirteenth embodiment, are also provided at an end part 116b of the carrier 116.

Two supporting members 117 according to the fourteenth embodiment, are joined to the rings 116a and 116b, respectively, that is, four members in total are used.

A threaded portion is formed at each supporting member 117. A supporting bar 120 is coupled to the threaded part 117a through an insulating washer 118 and a nut 119.

With this configuration, the supporting members 117 and supporting bars 120 are fixed to the outer cylinder 121 through the insulating washer 118.

Operation according to the fourteenth embodiment will be hereinafter described.

An electric current is applied to the honeycomb carrier 116 through between the supporting members 117 and supporting bars 120 when catalyst is not sufficiently activated just after an engine (not shown) is started up.

The current flows in the axial direction of the carrier 116, that is, from the up-stream side to the down-stream along a flow of exhaust gas.

The honeycomb carrier 116 having slits 116 by which high resistance, low thermal capacity, and less heat conducted to the outer cylinder 121 are provided, can raise temperature evenly for a short time, and activate catalyst, so that purification for exhaust gas is available in tens of seconds after started up, and high purification efficiency is achieved. Further, durability is also improved.

In the fourteenth embodiment, the supporting member 117 and supporting bar 120 are fixed in insulation with the outer cylinder 121 by means of the insulating washers 118 and nuts 119, though, it is not limited to this way.

The use of supporting members and bars which are made of insulating materials such as inorganic fiber materials, are preferably required for the self-heat generation type honeycomb carrier as the fourteenth embodiment.

The shape of a member for joining the honeycomb carrier and supporting members can not be limited to a ring shape, so that it could be, one not closed in a circumferential shape, with a cut-away portion to have expandability, or divided into more than two portions.

The cross section of the supporting member can be arbitrary shaped, though, preferably, smaller cross-sectional area is required to reduce the thermal capacity and thermal conductivity as far as the sufficient strength is ensured.

(The fifteenth embodiment)

Figure 41:
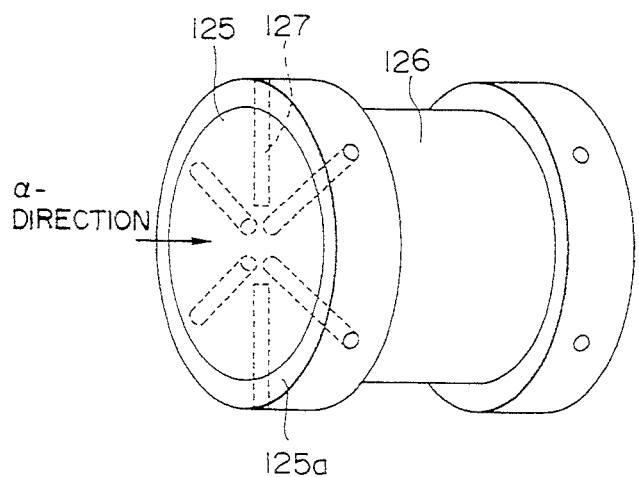
FIG. 41 is a schematic, perspective view showing a connected condition of a catalytic carrier and an outer sleeve associated with the fifteenth embodiment of the invention.

FIG. 41 is a type schematic view showing a honeycomb carrier 125 according to the fifteenth embodiment.

An outer cylinder 126 is provided partly or circumferentially at an end portion 125a of a honeycomb carrier 125.

This cylinder 126 is fixed at the carrier 125 by means of brazing or laser welding. This outer cylinder 126 is provided with a through member 127.

This through member 127 is six pieces in total, and each piece extends into the inner circumference of the cylinder 125. This member 127 is joined with the cylinder 125 by means of electric discharge welding, laser welding, soldering or the like.

Mainly, vibrations of the carrier 125 in the axial direction (a direction) are supported by the through members 127 internally extending into the honeycomb carrier 125.

As described above, the outer cylinder 126 and honeycomb carrier 125 are joined in a fit-in relationship by the through members 127.

Each linear thermal expansion coefficient for the through members 127 and honeycomb carrier 125 is nearly equalized by this configuration, so as to reduce the thermal stress produced on heat-cycle movement.

In the fifteenth embodiment, the through member 127 has a pin-like and a diameter of 3 mm, and there are six pins on the same face (at regular intervals), twelve pins in total for the all honeycomb carrier 125. A hole of the carrier in which a pin is inserted, is machined into a diameter of 2.9 mm by electric discharge machine.

Figure 42:
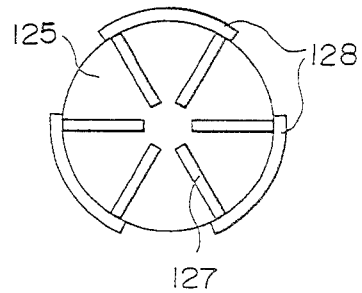
FIG. 42 is a schematic, perspective view showing another connected condition of a catalytic carrier and an outer sleeve associated with the same fifteenth embodiment.

In the fifteenth embodiment, the outer cylinder 126 is shaped in ring, though, it is not limited to this shape, for example, as in shown in FIG. 42, a set of outer cylinder 128 divided into more than two pieces may be employed.

Figure 43:
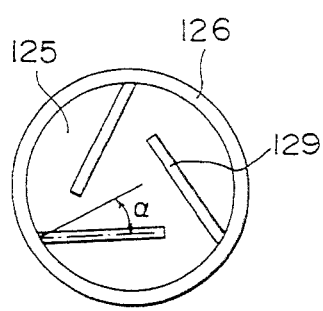
FIG. 43 is a schematic, perspective view showing still another connected condition of a catalytic carrier and an outer sleeve associated with the same fifteenth embodiment.

In FIG. 42, the through member 127 extends in the direction of the central axis of the honeycomb carrier 125, though, as shown in FIG. 43, a through member 129 extending at an angle of a° (0 < =a° < =70) with the direction of the central axis perpendicular to the plane and corrugated plates forming the carrier, may be employed.

Figure 44:
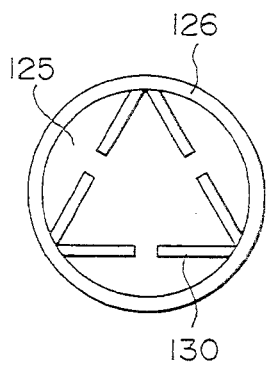
FIG. 44 is a schematic, perspective view showing still another connected condition of a catalytic carrier and an outer sleeve associated with the same fifteenth embodiment.

In FIG. 41, the through members 127 extend from different locations, respectively, though, as in FIG. 44 A plurality of through members 130 extending from a location may be employed.

The cross sectional shape for the through member is preferably a circle, though, it may be a polygon, or an oval.

By the use of the fifteenth embodiment, a honeycomb carrier for exhaust gas purification catalyst having a high durability against thermal stress produced upon heat-cycle process, is provided.

(The sixteenth embodiment)

The sixteenth embodiment according to the present invention, will be hereinafter described in detail.

Figure 45:
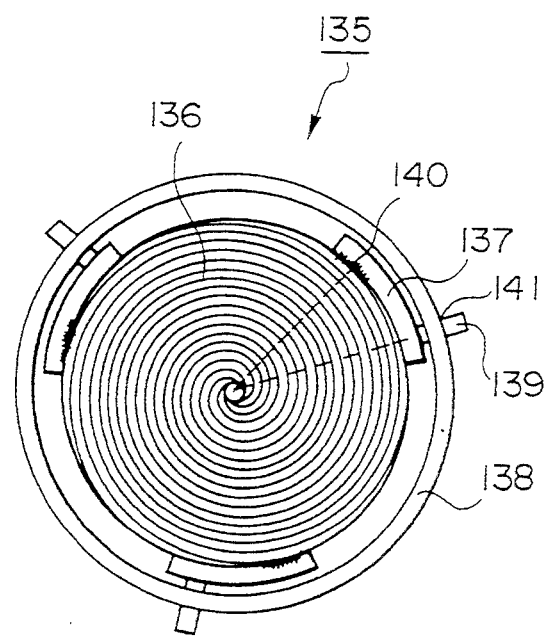
FIG. 45 is a schematic, perspective view showing a connected condition of a catalytic carrier and an outer sleeve associated with the sixteenth embodiment of the invention.

FIG. 45 is a type view of an exhaust gas purification honeycomb carrier according to the sixteenth embodiment.

An exhaust gas purification catalytic converter 135 according to the sixteenth embodiment, includes a honeycomb carrier 136 which is made of a plane plate and a corrugated plate, the plates being layered together and wound in spiral shape, a supporting member 137 cut in ring shape, a housing 138 containing the carrier 136, and coupling member 139 with which the carrier 136 is fixed in the housing.

A joining part 140 at which the supporting member 137 and carrier 136 are joined by laser-welding, soldering or the like, is formed at a part of the contact surface between the supporting member 137 and carrier 136. The coupling member 139 fitting in through the housing 138 makes contact with a part of the other surface of a surface facing the joining portion 140 of the supporting member 137.

Then, a joining portion 141 joined by welding is formed at the portion of the housing through which the coupling member 137 goes in.

As shown in FIG. 45, this joining portion 141 and the other joining portion 140 between the supporting member 137 and honeycomb carrier 136, are preferably not on the same radius, so that thermal stress is relieved by elasticity of the supporting member 137.

The honeycomb carrier 136 is fixed in the housing through the supporting member 137 and coupling member 139.

In the exhaust gas purification catalytic converter 135 according to the sixteenth embodiment, as described above, the supporting member 137 is partly made in contact with the outer circumference of the carrier 135, that is, all the outer circumference is not covered, so that the degree of freedom in the radial and circumferential directions is high and thermal stress produced on heat-cycle process is small.

The configuration is also very simple and a high durability is ensured.

(The seventeenth embodiment)

In the seventeenth embodiment, another embodiment in the sixteenth embodiment will be described.

In the sixteenth embodiment, the honeycomb carrier 136 is fixed at the housing 138 through the supporting members 137 and coupling members 139.

Figure 46:
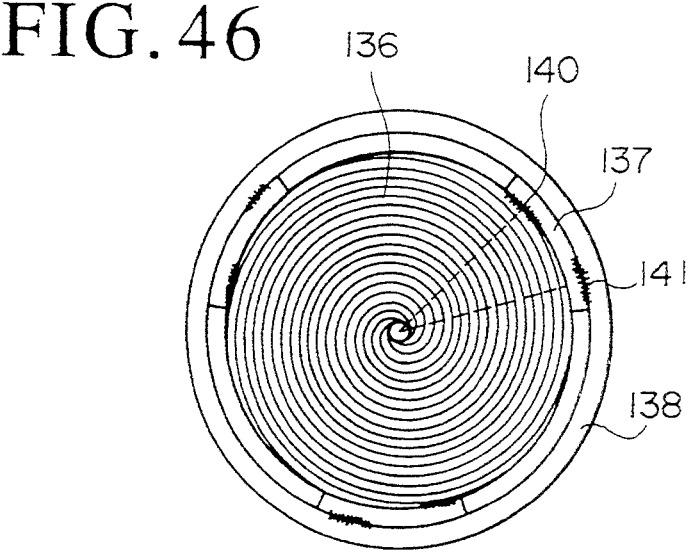
FIG. 46 is a schematic, perspective view showing a connected condition of a catalytic carrier and an outer sleeve associated with the seventeenth embodiment of the invention.

In the seventeenth embodiment, as shown in FIG. 46, it is fixed at a housing 138 only through supporting members 137.

In this case, a joining portion 141 which is partly joined is formed.

In FIG. 46, each of the joining portion 140 and 141 is not on the same radius by the same reason in the sixteenth embodiment.

Figure 47:
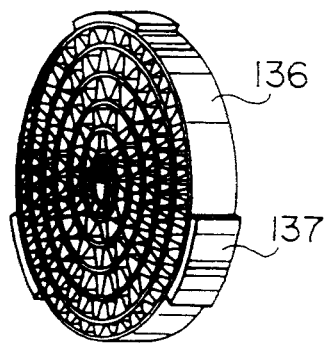
FIG. 47 is a schematic, perspective view showing another connected condition of a catalytic carrier and an outer sleeve associated with the same seventeenth embodiment.
Figure 48:
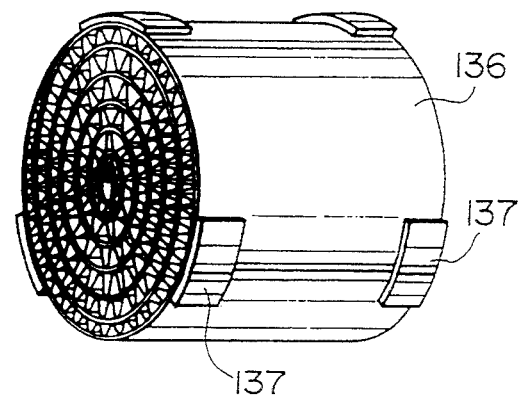
FIG. 48 is a schematic, perspective view showing still another connected condition of a catalytic carrier and an outer sleeve associated with the same seventeenth embodiment.

When a honeycomb carrier 136 is short in the axial direction, a supporting member extends over both end portions as shown in FIG. 47. When a carrier 136 is long in the axial direction, a supporting member 137 may be divided as shown in FIG. 48.

Figure 49:
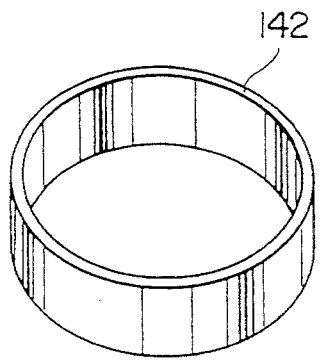
FIG. 49 is a perspective view showing a shape of a support member associated with the same seventeenth embodiment.
Figure 50:
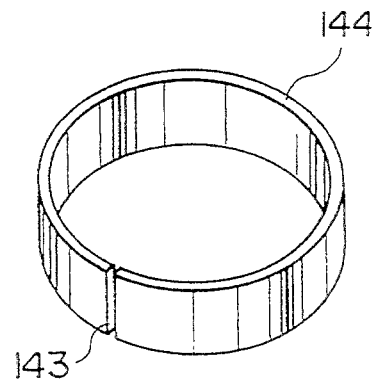
FIG. 50 is a perspective view showing another shape of a support member associated with the same seventeenth embodiment.

In the sixteenth embodiment, the supporting member 137 has a shape obtained when a ring is cut into pieces, though, it is possible to reduce thermal stress produced with a ring-like supporting member 142 shown in FIG. 49, if the member 142 is partly welded. The use of a supporting member having a partly cut away portion 143 as shown in FIG. 50, allows the relief of thermal stress with elasticity thereof.

Figure 51:
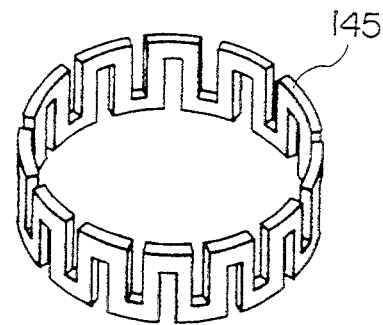
FIG. 51 is a perspective view showing still another shape of a support member associated with the same seventeenth embodiment.

A supporting member 145 may be a ring shaped in zigzag pattern as shown in FIG. 51.

Figure 52:
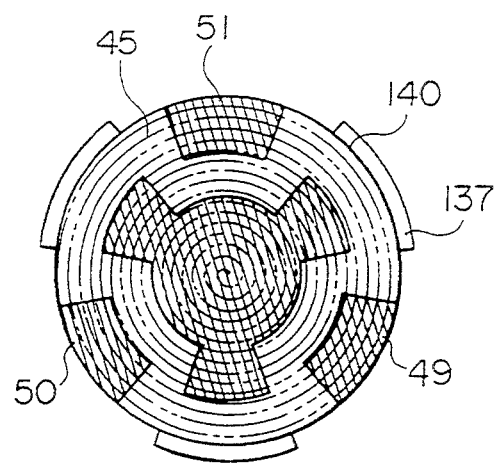
FIG. 52 is a schematic, perspective view showing still another connected condition of a catalytic carrier and an outer sleeve associated with the same seventeenth embodiment.

Further, how the honeycomb carrier according to the fourth embodiment is held in the housing, will be described hereinafter by reference to FIG. 52.

In this case, joining portions 140 between supporting members 137 and a honeycomb carrier 45 are formed onto the portions of the outer circumference, respectively, away from the outermost circumferential portions of the first, second, and the third regions 49, 50, and 51, in which a plane plate and a corrugated plate forming a honeycomb carrier 45 are welded adjacent to the outer circumference.

This structure allows the reduction in stress produced around the outermost circumference by the elasticity of the non welded portions on the outer circumference of the carrier 45.

Figure 53:
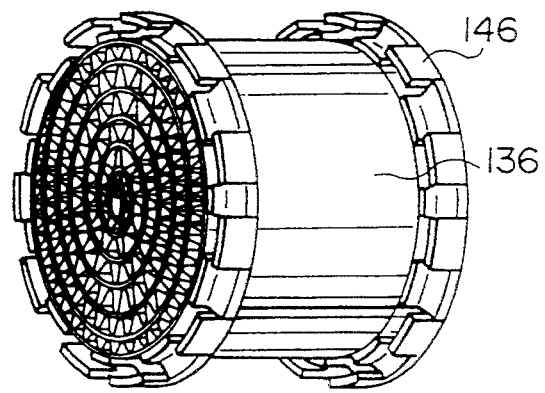
FIG. 53 is a schematic, perspective view showing still another connected condition of a catalytic carrier and an outer sleeve associated with the same seventeenth embodiment.

A converter may be provided by folding supporting members 146 alternately to the carrier side, as shown in FIG. 53.

This structure also allows the reduction in thermal stress by the elasticity of the supporting members 42.

By the use of the seventeenth embodiment as described above, a honeycomb carrier for exhaust gas purification catalyst having less thermal stress produced upon heat-cycle process, a high durability, and a simplified structure, is provided.

(The eighteenth embodiment)

Figure 54:
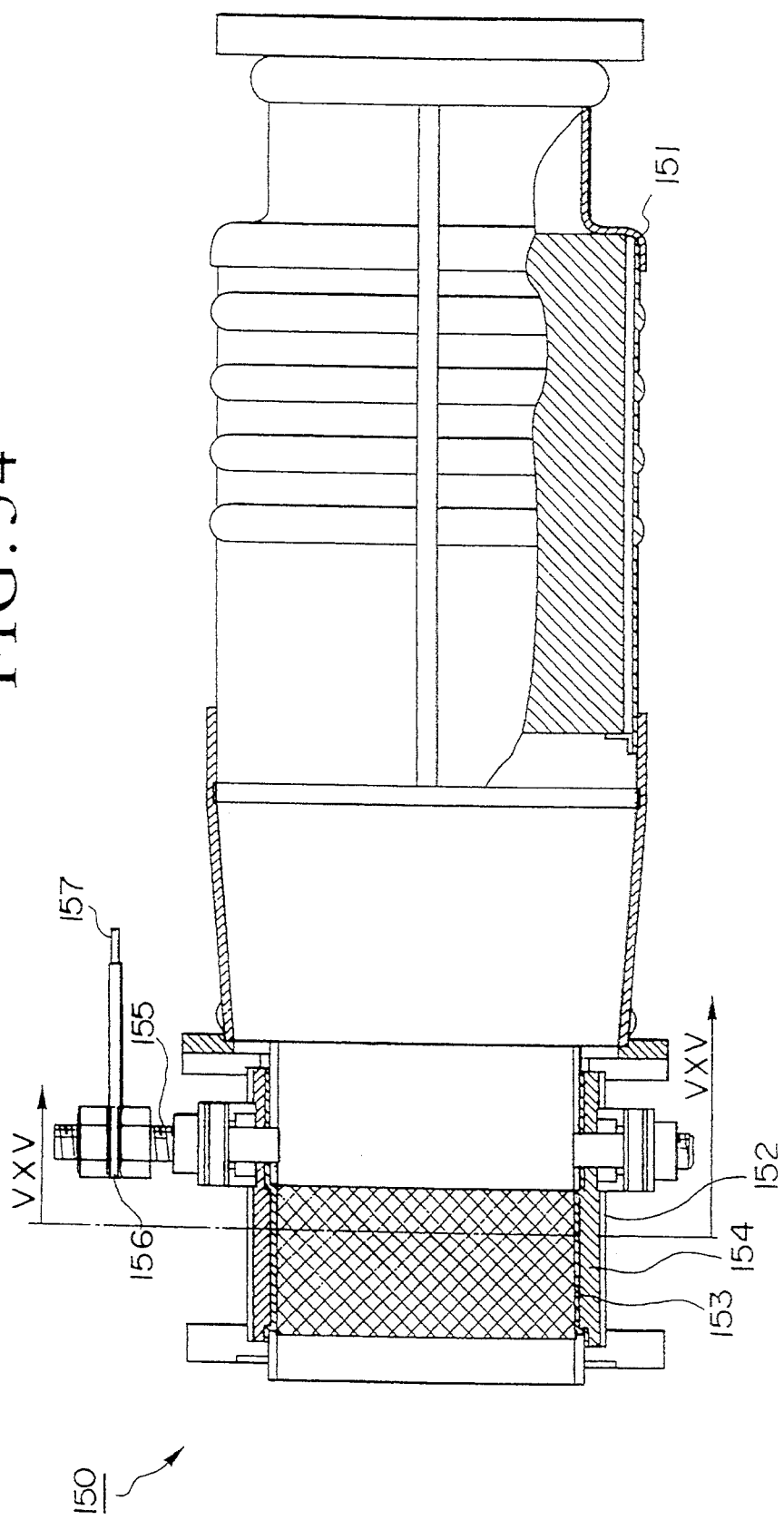
FIG. 54 is a schematic view of a self-heat generation type catalytic converter located in an exhaust pipe line system in association with the eighteenth embodiment of the invention.
Figure 55:
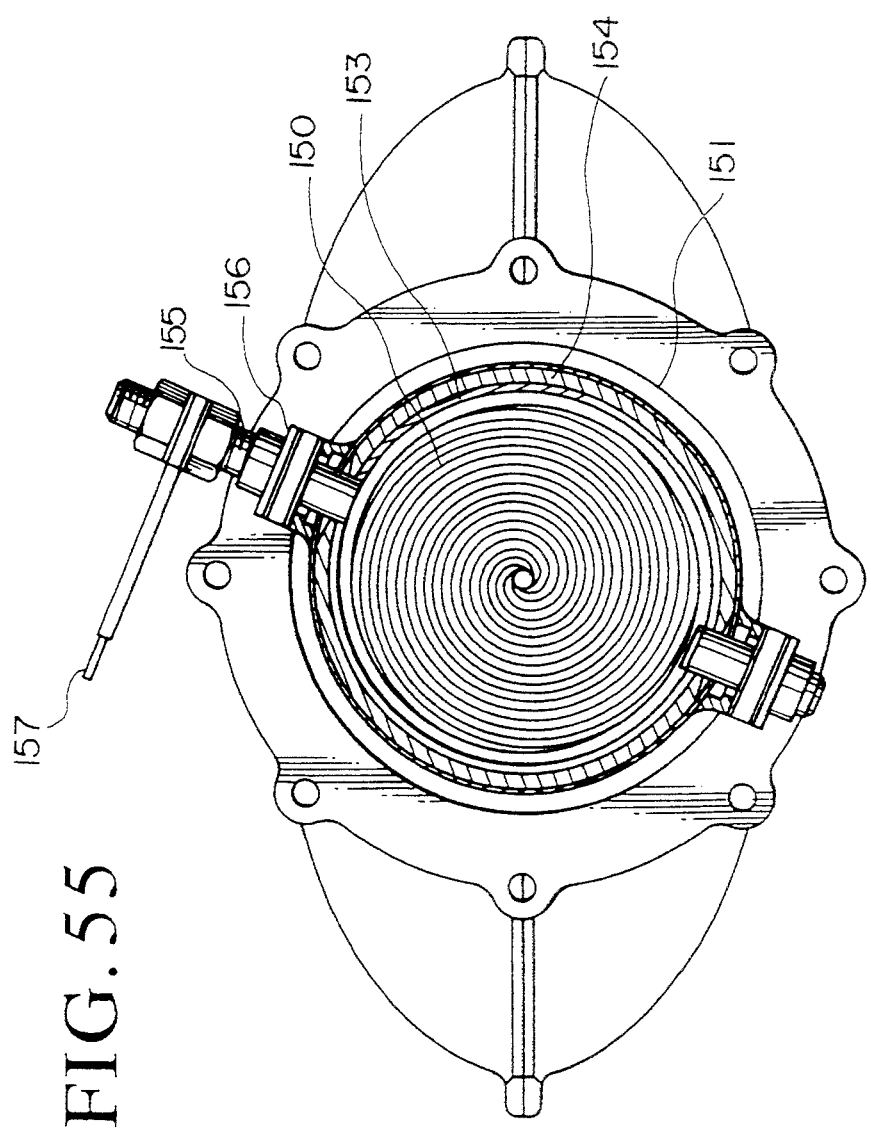
FIG. 55 is a cross sectional view taken along the line VXV—VXV of FIG. 54.

FIGS. 54 and 55 show this embodiment.

In the eighteenth embodiment, an embodiment relates to a structure holding the honeycomb carrier 1 shown in the first embodiment, into an outer cylinder.

A main monolith 151 is provided at the down-stream of a honeycomb carrier 150 in FIG. 54.

The carrier 150 and main monolith 151 have the same structure as described in the first embodiment. Namely, the carrier is configured of the plane and corrugated plates having slits partly.

Features according to the eighteenth embodiment, will be hereinafter described.

In the present embodiment, an outer cylinder 152 is provided, so as to contain a honeycomb carrier 150 therein. Two types of heat insulators 153, 154 are filled between the carrier 150 and cylinder 152.

The heat insulator 153 is provided to cover the carrier 150 directly, and expose itself to exhaust gas directly, and the material is made of an inorganic long-staple fiber.

The heat insulator 154 is provided to cover the outer surface of the heat insulator 153, and made of a group of inorganic short-staple fibers.

These heat insulator 153 and 154 may be mixed with a material having a thermal expansibility such as vermiculite.

The up-stream side of the carrier 150 is electrically connected with the outer cylinder 152, and the ground.

An electrode 155 is inserted into the carrier 150 through the cylinder 152 and electrically connected with the, down-stream side of the carrier 150 directly. The electrode 155 and cylinder 152 are electrically insulated by an insulator 156. An electric current is applied from a lead line 157 to the down-stream of the carrier 150 through the electrode 155.

Operation according to the eighteenth embodiment will be hereinafter described.

An electric current is applied when the main monolith. 151 is not activated yet just after an engine (not shown) starts up.

The honeycomb carrier 150 having slits can increase resistance higher and make the thermal capacity extremely smaller. Therefore, when the current is applied to the carrier 150, the carrier 150 is smoothly raised in temperature, so that catalyst held at the carrier 150 is also activated for a short time. Accordingly, the unpurified gas of exhaust gas from an engine just after started up, can be reduced into a small amount.

The heat insulators 153 and 154 are provided to prevent heat of the carrier from leaking to the cylinder 152 in the eighteenth embodiment, so as to accelerate the increase in temperature. The heat insulator 153 and 154 are flexible and elastic enough to hold the carrier 150 with the all side face, so as to protect the carrier from vibration.

The effect is greater if the heat insulators 153 and 154 are mixed with a heat expansible material.

The heat insulator 153 is a woven cloth made of long fiber, and provides high durability against wind loss, high adiathermanous, so as to prevent the heat insulator 154 which is weak against wind-loss and blow-through, from being scattered in the exhaust gas. With the structure as described above, heat produced by electrically heating the carrier 150 and heat of catalytic reaction are conducted to the main monolith 151 by a flow of exhaust gas, when the temperature of the carrier 150 is raised to be in a state of activation, so that the, activation of the carrier is further accelerated to reduce gas which is exhausted as unpurified gas.

(The nineteenth embodiment)

The present embodiment relates to a structure which holds an electrode for supplying power to a honeycomb carrier.

Figure 56:
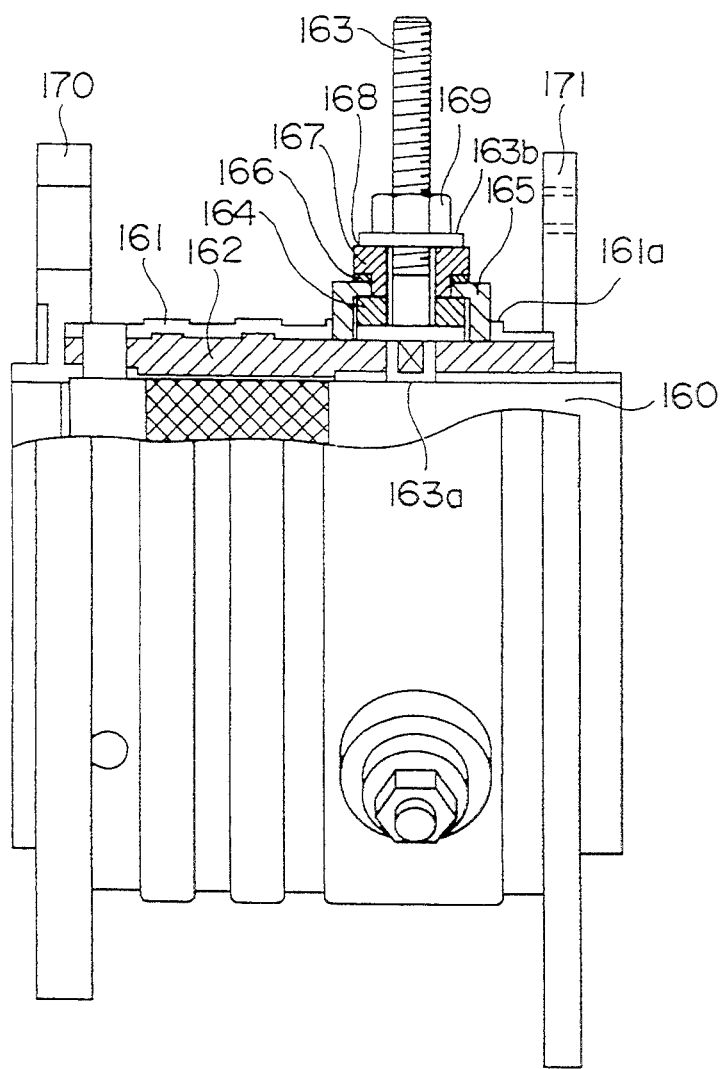
FIG. 56 is a schematic view of a self-heat generation type catalytic carrier associated with the nineteenth embodiment of the invention.

In FIG. 56, an outer cylinder 161 is provided to hold a honeycomb carrier 160 therein through a heat insulator 162.

An opening 161a is formed at a part of the cylinder 161. An electrode 163 having a stopper surface for fixing a nut is inserted through the opening 161a, so that the end face 163a of the electrode 163 and the carrier 160 are welded together to have an electric contact each other.

This electrode 163 is fixed at the outer cylinder 161 in the following in manner.

Namely, a flange 163b is united at the electrode 163 in one body. A first insulating material 164, a mount 165, a washer 166, a second insulating material 167, and a washer 168 are successively layered from the circumference of the carrier 160 at the carrier side of the flange 163b as shown in FIG. 56.

This layer is locked with a nut 169 from the other side of the flange 163b opposite to the carrier side.

By the use of this structure, the electrode 163 is electrically insulated with the cylinder 161.

The mount 165 is the same in diameter as the opening 161a machined at the cylinder 161.

According to the nineteenth embodiment, airtightness, and resistance against vibration from an engine are ensured, and the electrode 163 is fixed at the mount 165 by the axial force durable against the thermal deformation of the cylinder 161 upon engine heating-cooling cycle. Then, the electrode 163 is fixed in welding with the cylinder 161 by the mount 165, so that it is fixable without deformation of the carrier 160 by a predetermined torque.

By the use of the nineteenth embodiment as described above, a self-heat generation type catalytic converter with which durability, air-tightness, and resistance against vibration are ensured, is provided.

In this embodiment, the mount 165 is the same in diameter as the opening 161a machined at the cylinder 161, though the bore diameter of the opening 161a may be machined larger than that of the mount 165.

Namely, If the bore diameter of the opening 161a is machined greater than that of the mount 165, the location of the electrode will be shifted in the axial or circumferential direction of the carrier 160 to fix it, in case of thermal deformation is produced by welding the flange 170, 171 when the mount 165 is fixed in welding at the cylinder 161. Consequently, no stress is affected radially or axially on the honeycomb carrier, so that deformation of the carrier is prevented.

What is claimed is:

1. A self-heat generating honeycomb filter mounted in an exhaust pipe line of an engine and including a plane plate and a corrugated plate, said honeycomb filter comprising:

a portion having a plurality of openings formed in at least a part of at least one of said plane plate and said corrugated plate, said plates being constructed and arranged to permit electric current to flow either from an up-stream side end portion of said filter to a down-stream side end portion thereof or from a down-stream side end portion of said filter to an up-stream side end portion thereof.

2. The honeycomb filter according to claim 1, wherein said plane and corrugated plates are wound into a cylindrical shape.

3. The honeycomb filter according to claim 1, wherein at least one of said plates include input/output portions constructed and arranged such that an electric current can be applied to said portion.

4. The honeycomb filter according to claim 1, wherein at least one of said plates includes a region where said openings are not provided, said region being formed at an up-stream side end portion and a down-stream side end portion of at least one of said plane plate and corrugated plate for coupling to said exhaust pipe line of the engine.

5. The honeycomb filter according to claim 1, wherein openings of said portion at boundary regions thereof and at said end portions are smaller than openings of said portion at other regions thereof.

6. The honeycomb filter according to claim 1, wherein only said end portion of said plane plate or corrugated plate has catalyst supported thereon.

7. The honeycomb filter according to claim 1, wherein only said up-stream side end portion of said plane plate or corrugated plate has no catalyst supported thereon.

8. The honeycomb filter according to claim 1, wherein said plane plate and said corrugated plates are joined at joining points such that the joining points between the plane and corrugated plates at the central region of said honeycomb filter are greater than that at an outer circumferential region thereof.

9. The honeycomb filter according to claim 1 or 2, wherein the plane and corrugated plates are alternately laminated on each other.

10. The honeycomb filter according to claim 4, wherein said portion is formed at an up-stream side of the plane and corrugated plates in the axial direction thereof.

11. The honeycomb filter according to claim 5, wherein said plane plate and said corrugated plate are coupled such that the plane plate and corrugated plate which are laminated on each other are joined at every second point of contact therebetween along a joined portion thereof.

* * * * *